Nov. 21, 1950     H. GANG     2,531,204

CARRIAGE TABULATING MEANS

Filed Feb. 16, 1948     12 Sheets-Sheet 1

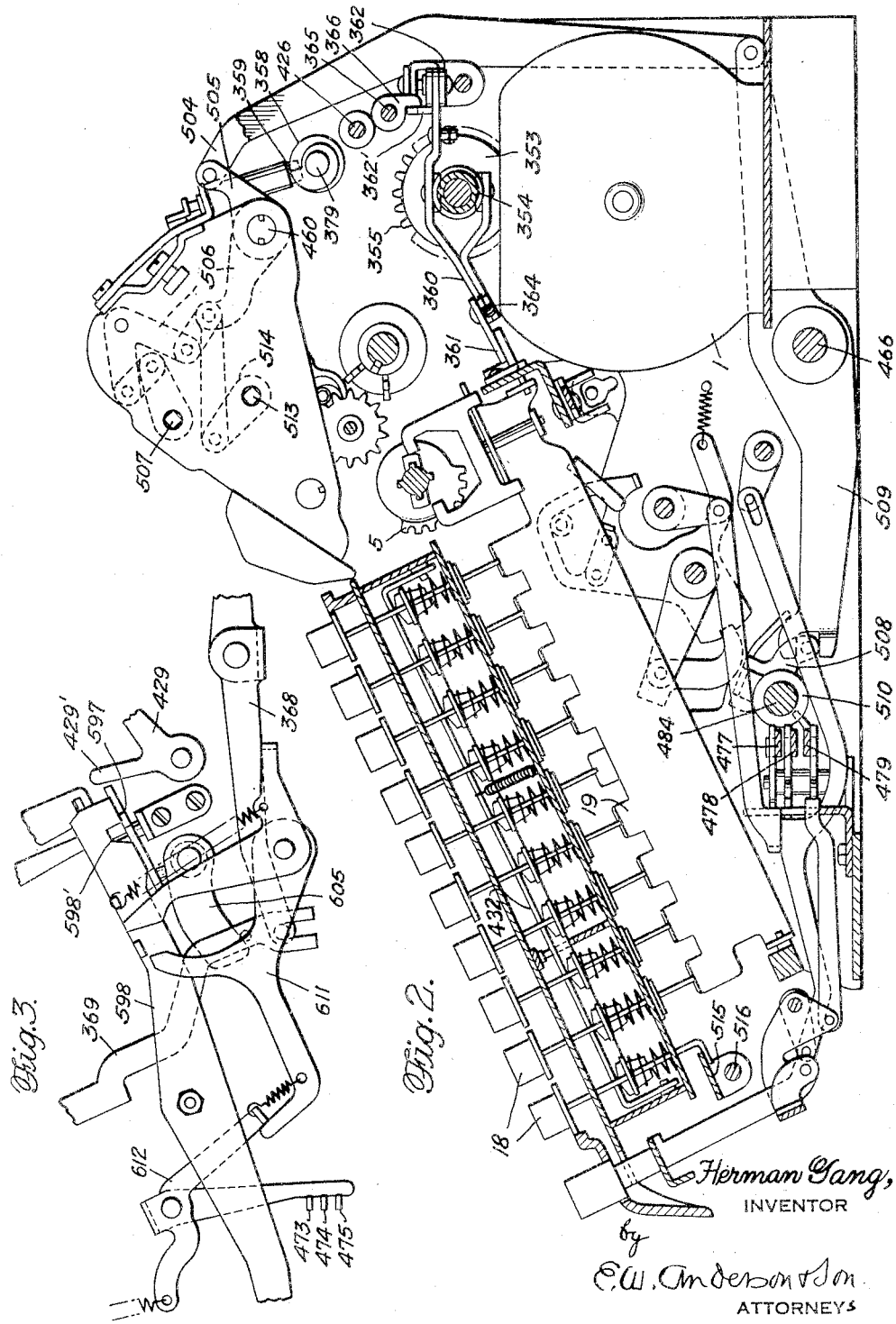

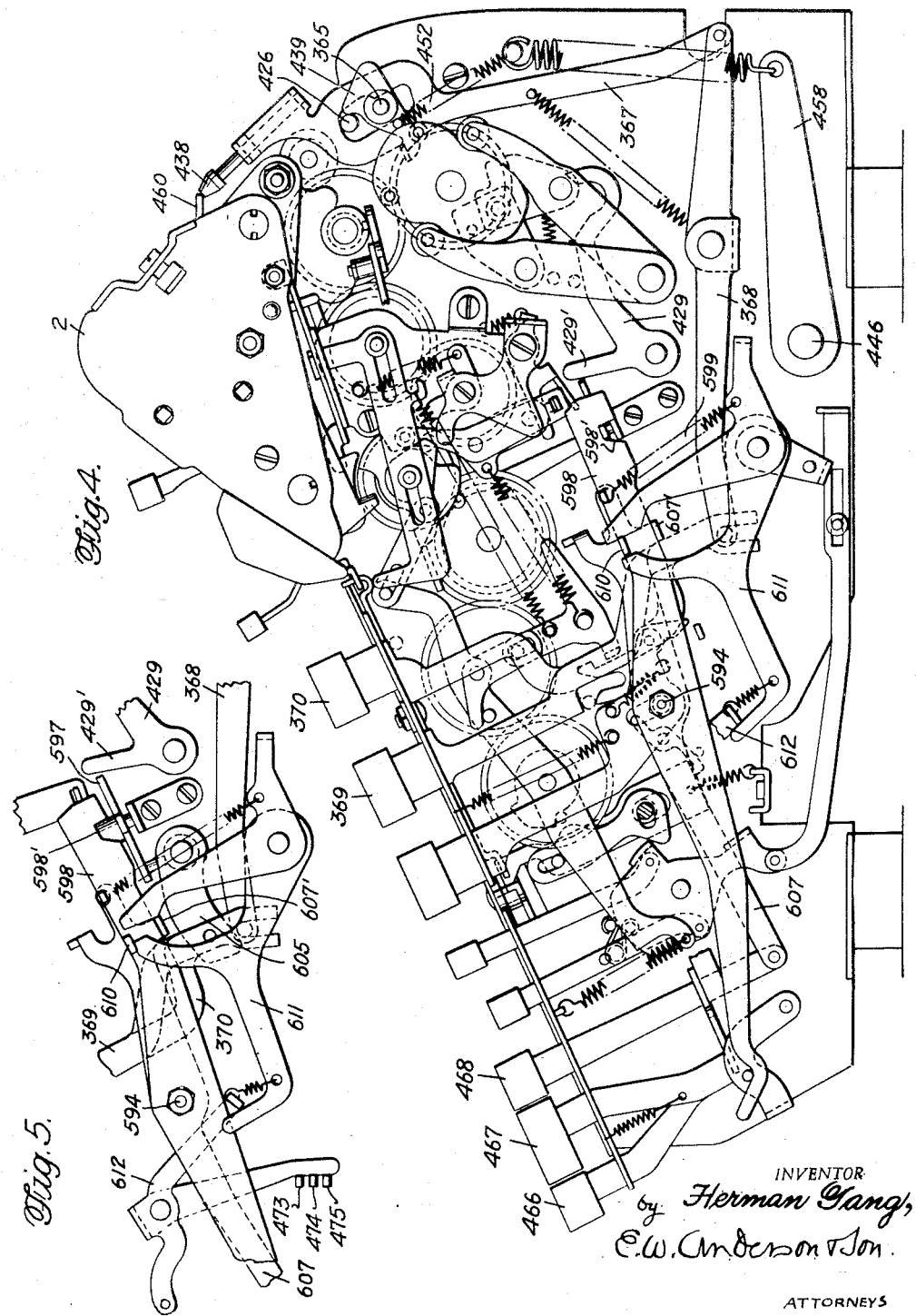

Nov. 21, 1950 H. GANG 2,531,204
CARRIAGE TABULATING MEANS
Filed Feb. 16, 1948 12 Sheets-Sheet 4
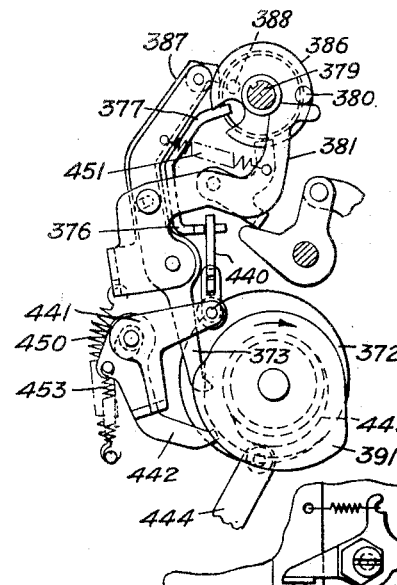
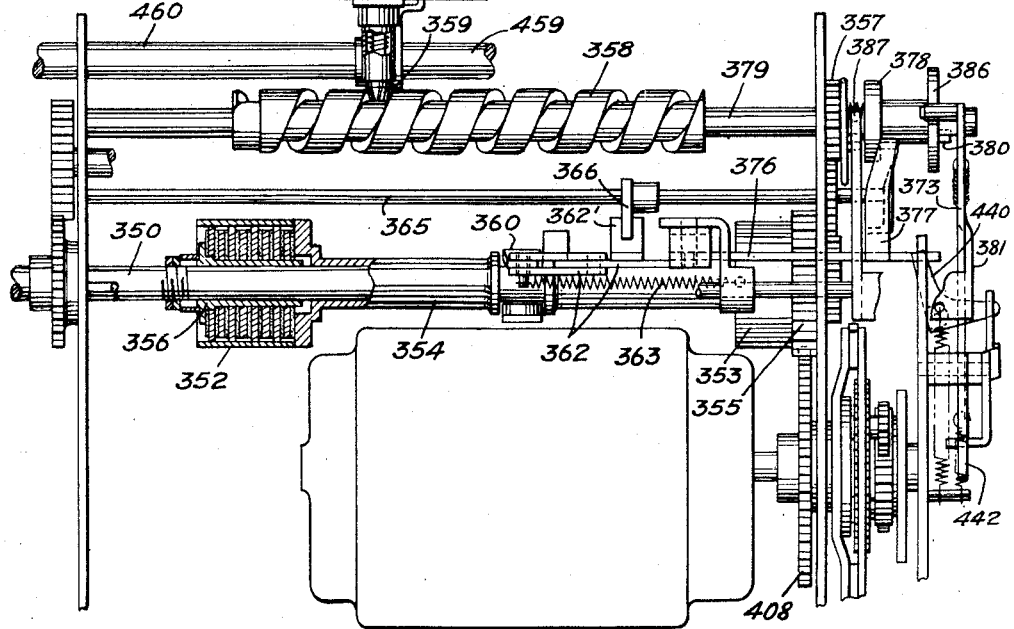
INVENTOR.
Herman Gang,
BY
E.W. Anderson & Son
ATTORNEYS

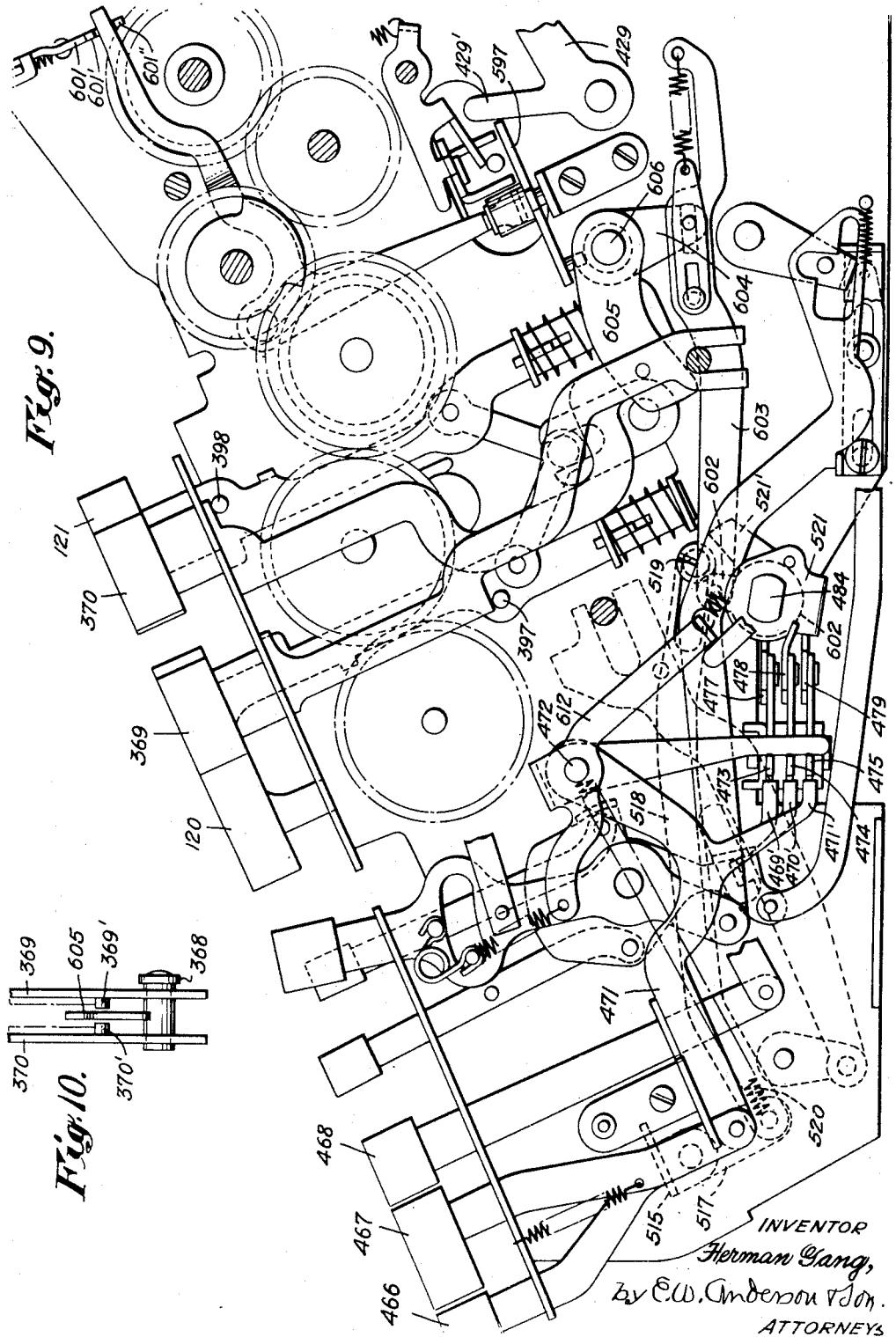

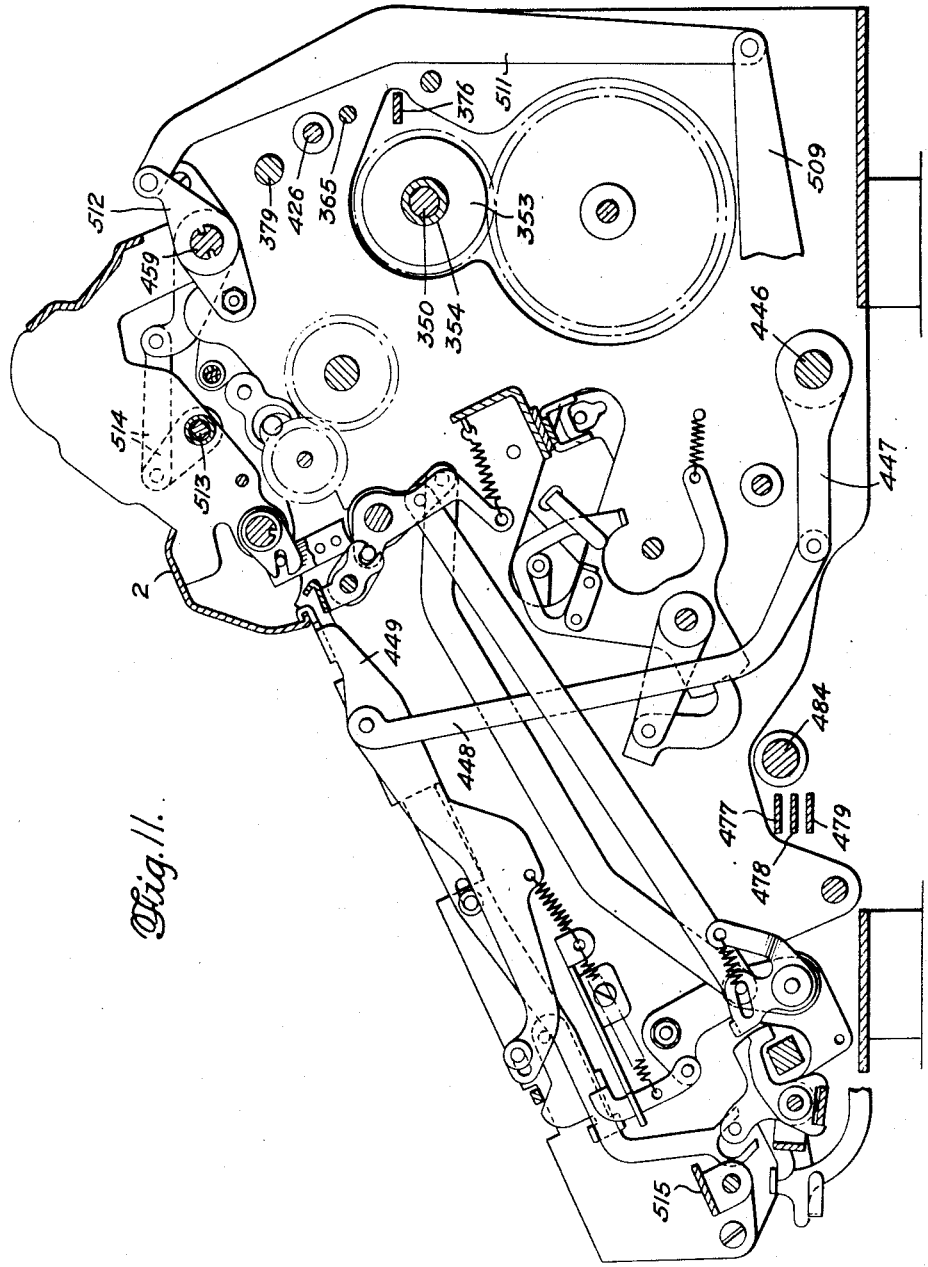

Nov. 21, 1950  H. GANG  2,531,204
CARRIAGE TABULATING MEANS
Filed Feb. 16, 1948  12 Sheets-Sheet 8
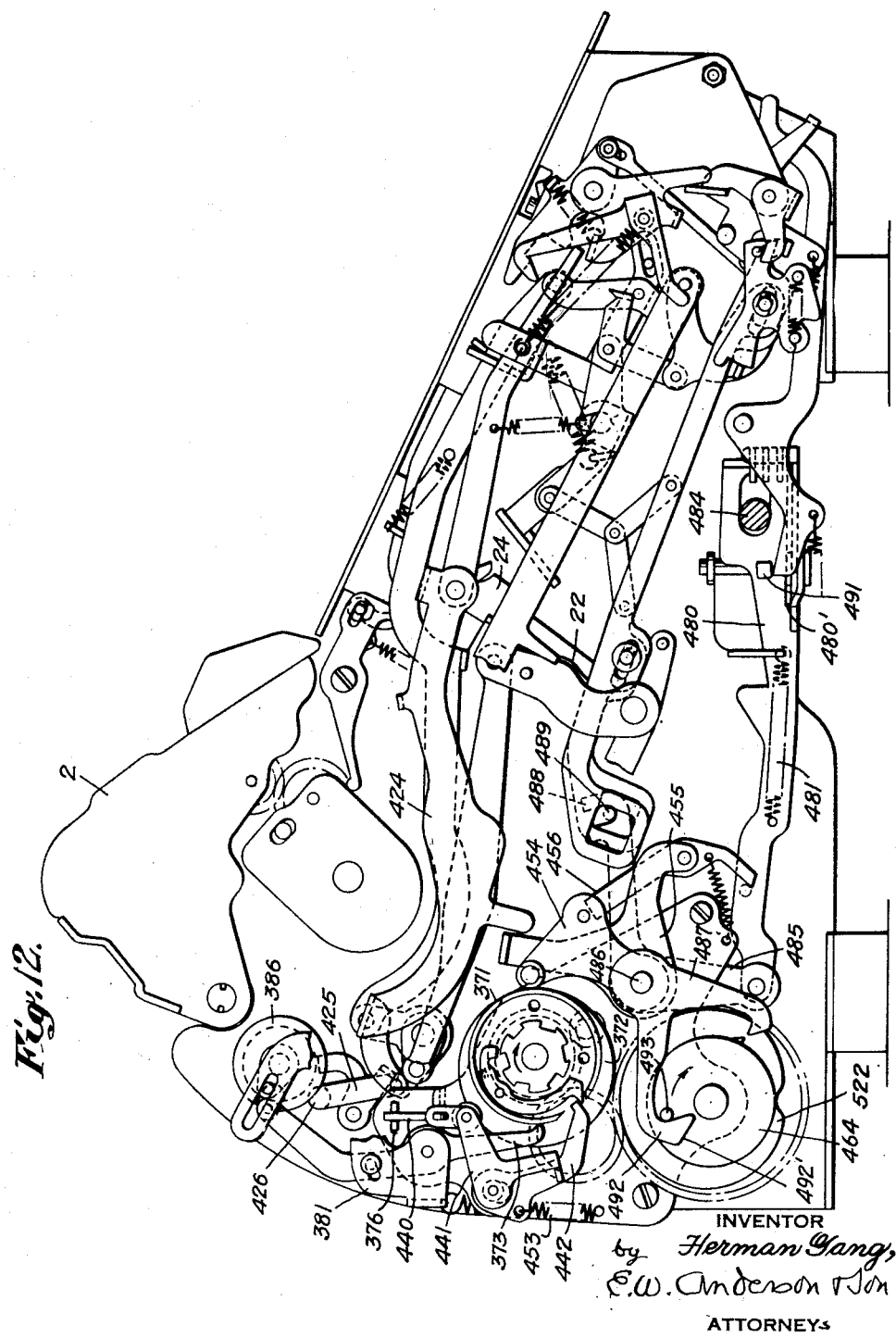

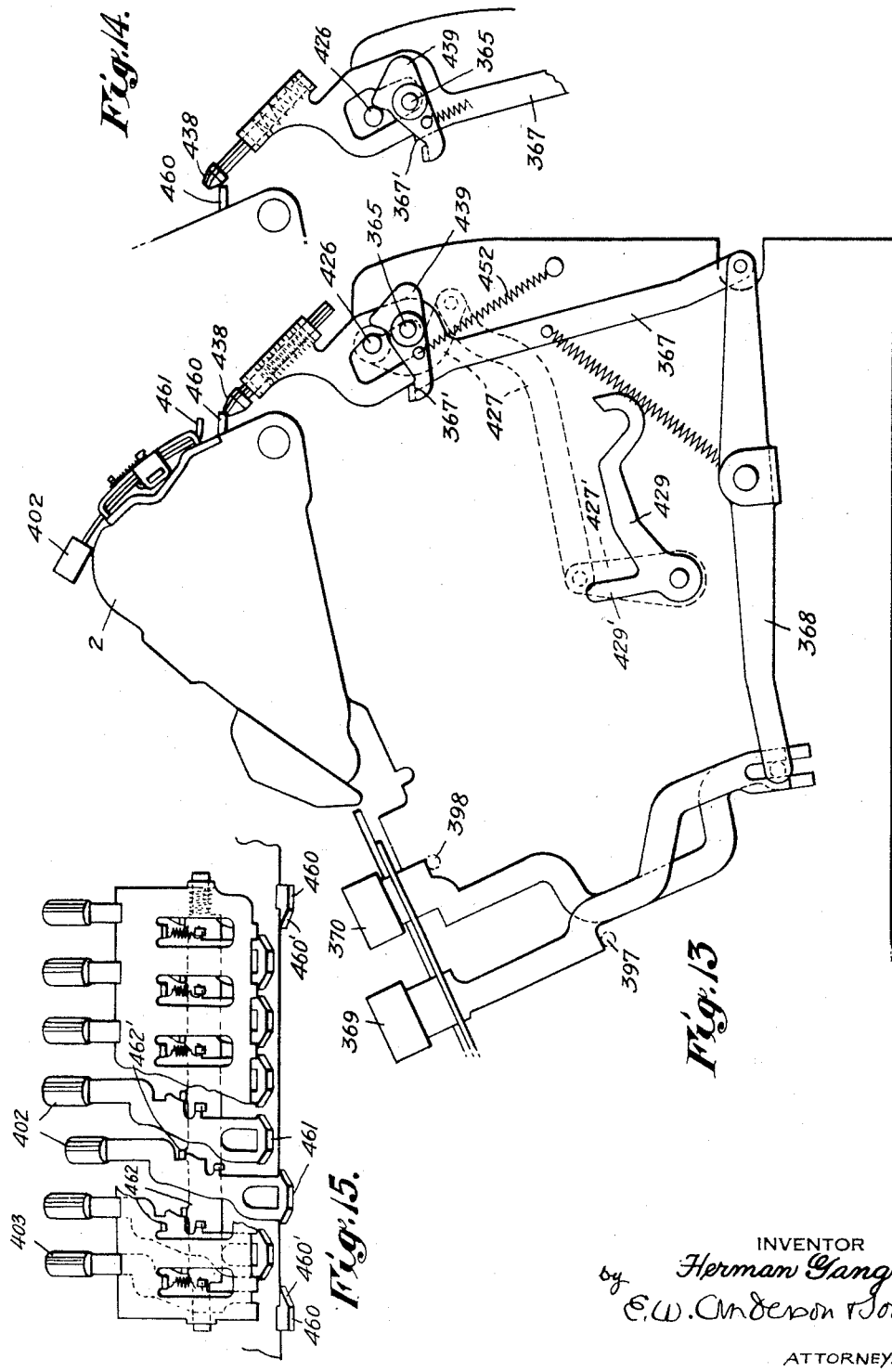

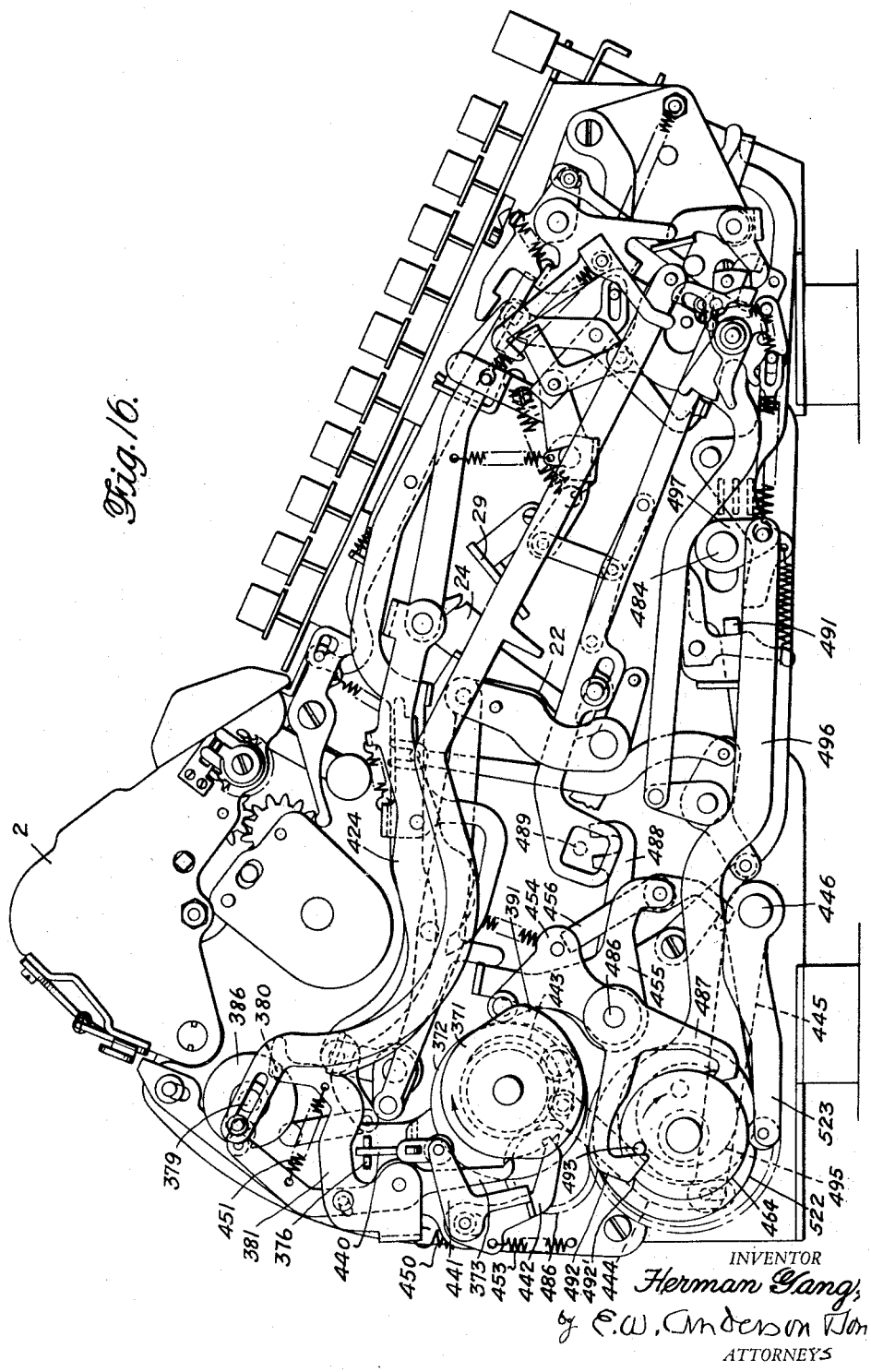

Nov. 21, 1950  H. GANG  2,531,204
CARRIAGE TABULATING MEANS
Filed Feb. 16, 1948  12 Sheets-Sheet 11

INVENTOR
Herman Gang,
BY
E.W. Anderson Son.
ATTORNEYS

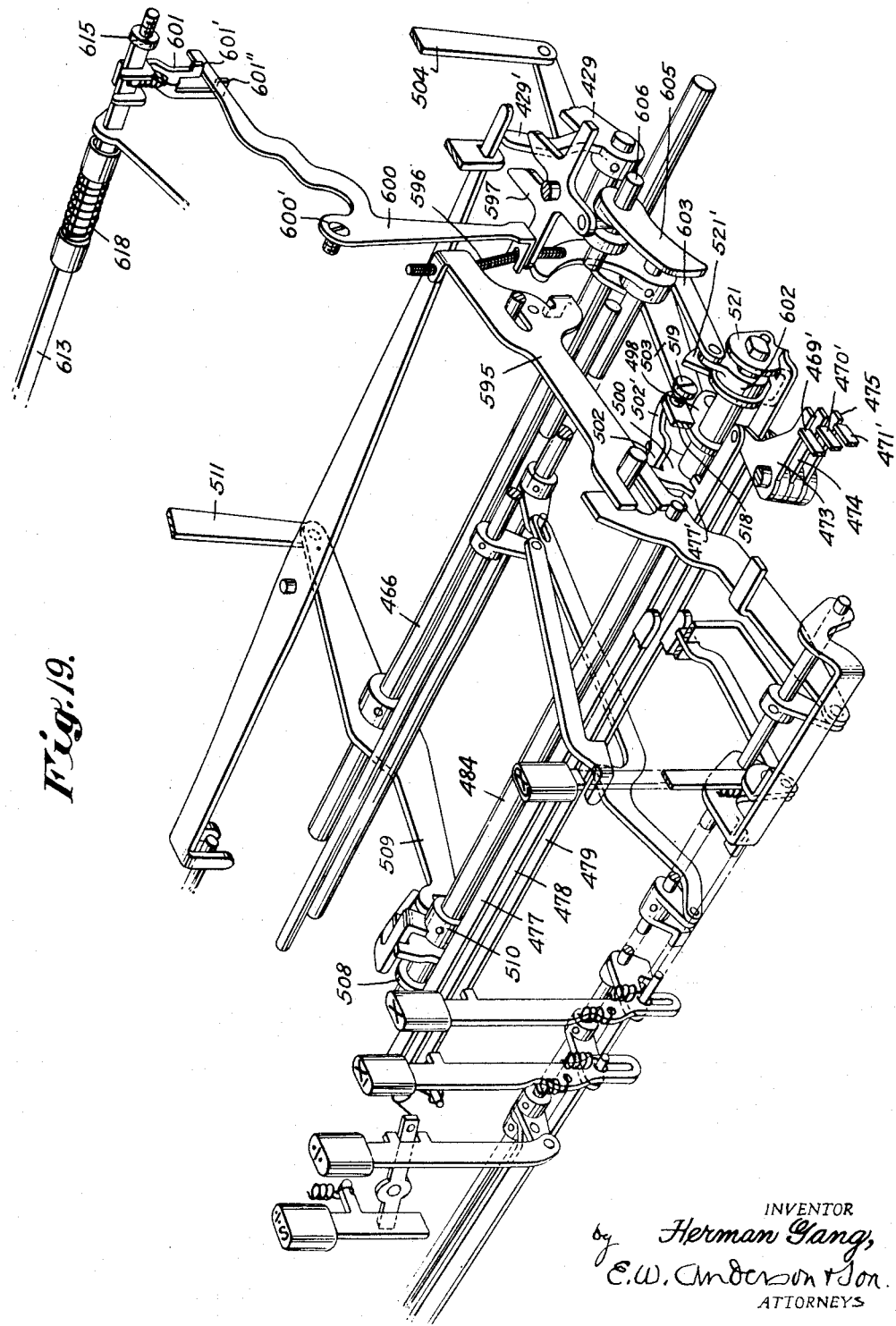

Patented Nov. 21, 1950

2,531,204

UNITED STATES PATENT OFFICE 2,531,204

CARRIAGE TABULATING MEANS

Herman Gang, Livingston, N. J., assignor to Monroe Calculating Machine Company, Orange, N. J., a corporation of Delaware Application February 16, 1948, Serial No. 8,544

16 Claims. (Cl. 235—63)

1

The invention relates to calculating machines, an object of the invention being to provide improved means for tabulating the transversely shiftable carriage thereof to a selected denominational position. Another object is to provide improved means for so tabulating the carriage to the right or alternatively to the left.

Another object is to provide means for so tabulating the carriage comprising clearout means for a register of the carriage.

Another object is to provide means for so tabulating the carriage comprising clearout means for a plurality of registers adjustable selectively to clear one and/or another of said registers.

Other objects and advantages will appear hereinafter or will be obvious.

The invention consists in the novel construction and combinations of parts as hereinafter set forth in the claims.

In the accompanying drawings,

Figure 2 is a vertical section showing the keyboard and the carriage shift mechanism.

Figure 3 is a fragmentary elevation of portions of the carriage return mechanism in an operative position.

Figure 4 is a right side elevation of the machine, with the parts in normal position.

Figure 5 is a fragmentary elevation of portions of the carriage return mechanism in an operative position.

Figure 6 is an elevation and partial section of portions of the carriage shift and actuator drive and control mechanisms as viewed from the rear of the machine.

Figure 7 is a detached fragmentary left side elevation of portions of the carriage shift and actuator drive control mechanisms.

Figure 9 is an enlarged right side elevation showing portions of the controls for the clearout mechanism and the controls for the carriage return mechanism.

Figure 10 is a fragmentary view of the carriage shift keys shown in Figure 9, as viewed from the left.

Figure 11 is a vertical section taken just inside the left hand side frame of the machine, showing certain linkage for the clearout mechanism and means for raising and lowering the carriage.

Figure 12 is a left side elevation of the machine, showing the clearout clutch and the two phase carriage shift control clutch and certain associated mechanisms.

Figure 13 is a right side elevation of the carriage shift keys, the tabulator keys, and certain associated mechanism.

Figure 14 is a fragmentary view, showing certain parts illustrated in another position in Figure 13.

Figure 15 is a fragmentary rear view of the main carriage, showing the tabulator keys mounted thereon.

Figure 16 is a left side elevation of the machine, with the parts in normal position.

Figure 19 is a perspective view, with several of the parts in exploded relationship, of portions of the clearout and carriage return mechanisms.

Carriage shift mechanism

The carriage shift devices herein disclosed embody the operational features substantially as set forth in Patent No. 2,419,760 to E. F. Britten, Jr. However, means for lifting the carriage to partly unmesh the intermediate gears in the carriage and body of the machine for clearance prior to initiation of a shift, are included. Furthermore, tabulating keys are provided whereby a shift may be terminated in a predetermined position during the time one of the shift keys is held depressed. Part of the tabulating means also functions in the performance of certain calculations to terminate the shift when the carriage has been shifted to one or the other of its extreme positions.

Figure 1:
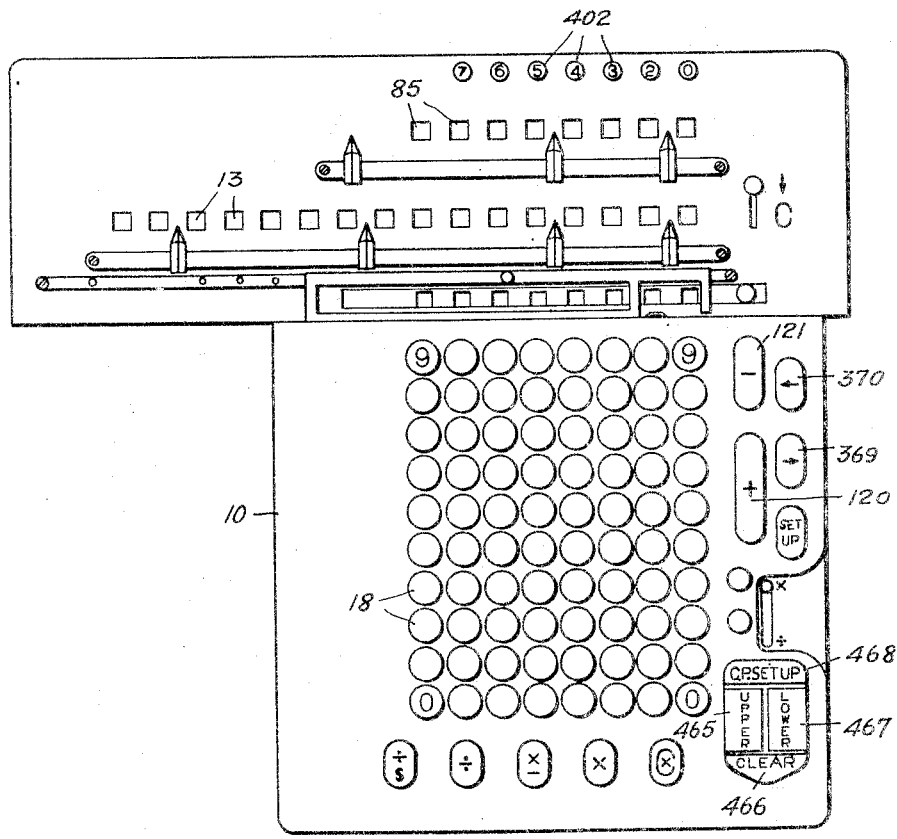
Figure 1 is a plan view of a calculating machine embodying the invention.

As herein disclosed and as set forth in the above mentioned patent, the means which control the extent and direction of actuator movement are utilized to control the extent and direction of shift of the carriage 2 (Fig. 1). For this purpose, two friction clutches 352 and 353 are provided as shown in Fig. 6, the driving elements of these clutches being connected for rotation as a unit by a sleeve 354. The driving elements of clutches 352 and 353 are connected to the output gear 408 of the differential gear drive by means of a gear 355 secured to the driving member of clutch 353. The driven member of clutch 352 consists of a sleeve 356, fast upon shaft 350, a series of friction disks being interposed between the driving member of the clutch and the driven member 356. Normally clutch 352, is held engaged under spring tension, connecting the drive to the actuators to the output of the differential.

Clutch 353, which is normally disengaged, has a driven member similar to member 356 of clutch 352 except that it is freely supported on shaft 359 and is provided with gearing connection 357. The carriage is mounted at its ends and center on the aligned shafts 459 and 460 which are slidably and pivotally mounted in the framing of the machine. Worm 358 is engaged by a spring plunger 359 depending from carriage 2, the carriage thus being shifted to the right or to the left upon rotation of the worm 358 in one or the other direction.

Sleeve 354 is moved to the right or to the left, and is held under spring tension in either shifted position, to engage clutch 352 or clutch 353 by means of a toggle arrangement best shown in Figs. 2 and 6 and fully disclosed in the aforementioned Patent No. 2,419,760. A shifting arm 360 is provided with anti-friction rollers engaging between flanges of sleeve 354, and is pivoted at one end to a link 361, having pivotal connection to the machine framing, and at the other end has connection with one link of a toggle 362, the far end of the other link of this toggle being also pivotally secured to a bracket rigidly mounted on a fixed shaft extending between the side frames of the machine. In normal position of the parts toggle 363 is fully extended, holding arm 360 against the tension of spring 363 in position to engage clutch 352, in which position the clutch is yieldably held engaged under the tension of a spring 364 connected to link 361. In order to disengage clutch 352 and engage clutch 353 means are provided for breaking the toggle 362, thereby allowing spring 363 to move sleeve 354 to the right as viewed in Fig. 6, in which position clutch 353 will be held engaged under tension of spring 363. For breaking the toggle, a shaft 365 is adapted to be rocked clockwise (Fig. 2) and is provided with a finger 366 which will unset the toggle through contact with a lug 362' of one of the links thereof. Shaft 365 is rocked by depression of the right shift key 369 or left shift key 370 (Figs. 1 and 9) as follows:

These keys 369 and 370 are mounted in the machine frame closely adjacent to the plus bar 120 and minus bar 121 (Figs. 1 and 9). Right shift key 369 has a shoulder overlying a stud 397 carried by the stem of plus bar 120, and left shift key 370 has a shoulder overlying a stud 398 in the stem of minus bar 121, both keys extending downward and having slot and pin connection with a lever 368 (Figs. 4, 10, 13). Pivotally mounted on the rear end of lever 368 and spring biased toward the front of the machine is arm 367 provided with a shoulder 367' (Figs. 13 and 14) and at the free end thereof a plunger 438 the function of which will be later described. Fixed on shaft 365 extending through the frame of the machine is latch lever 439, the forward end of which is provided with a bent over portion normally overlying the shoulder 367' on arm 367 and a nose portion to the rear which acts as a stop by contact with shaft 426. Depression of the right shift key 369 will, therefore, effect depression of the plus bar 120, effecting additive drive from the differential to the driving members of friction clutches 352 and 353 and conversely negative drive from the differential will be effected by depression of the left shift key 370 which will effect depression of the minus bar 121. At the same time, depression of either of these shift keys will depress the forward end of lever 368 (Fig. 13) and raise its rearward end with the arm 367 attached thereto. This movement will rock latch lever 439 and shaft 365 clockwise by contact of shoulder 367' with the bent over portion of said lever, breaking the toggle 362 and engaging shift clutch 353 at which time clutch 352 is disengaged. Although drive to the shift worm 358 is thus effected, clutch 352 will slip momentarily and the worm 358 will be held locked against rotation while a one cycle clutch 371 (Figs. 12 and 16) makes a partial rotation comprising a relatively short step in the cycle to effect lifting of the carriage 2 to provide clearance during the shift as follows:

When toggle 362 is broken to initiate a shift, a slide 376 (Fig. 6) connected to a crank extension of one of the toggle links 362 will be moved to the right. The end of the slide 376 has slot connection with the upper arm of a bell crank lever 440 the other arm of which has link connection to one arm of another bell crank lever 441 (Figs. 12, 16). The depending arm of bell crank lever 441 engages a detent 442 which is spring urged to normally engage a pawl of clutch 371, holding it disengaged. The clutch is driven through suitable gearing by the electric motor 1. Upon movement of slide 376, the bell crank lever 440 will therefore be rocked and accordingly the bell crank lever 441, will also be rocked which will lift detent 442 against tension of spring 453 out of engagement with the pawl of clutch 371 to engage the drive. A second detent 373 normally rests against the periphery of the driven member of clutch 371 and has pin and slot connection with tripping arm 381. A spring 450 urges arm 381 counterclockwise and thus detent 373 in the same direction. An upwardly extending arm of the detent 373 is provided with a roller which normally engages a slot in the disk 386 secured to a sleeve which is splined to shaft 379 of the shifting worm 358. Thus the worm is held against rotation until the clutch 371 has rotated a distance which allows the detent 373 to engage the pawl of clutch 371 and interrupt the drive (Fig. 7). When the detent 373 moves inwardly to disengage the clutch 371, the upwardly extending arm of the detent disengages its roller from the slot in disk 386, permitting the engaged shift clutch 353 to drive the shifting worm 358.

The above described step in the cycle of rotation of clutch 371 effects lifting of the carriage 2 through a cam 443 (Figs. 7 and 16) secured to the driven member of the clutch. A link 444 provided with a roller at its upper end in contact with the cam 443 and guided by a slot in the framing of the machine is moved downwardly by rotation of said cam (Fig. 7). Link 444 is attached through pin and slot connection to the end of arm 445 (Fig. 16) fixed on a shaft 446 extending across the machine. Downward movement of link 444 will thus rock shaft 446 counterclockwise, Fig. 16, and clockwise (Fig. 11) against the tension of a spring attached to arm 458 fixed on said shaft (Fig. 4). Fixed on shaft 446 is a pair of arms 447 (one of which is shown in Fig. 11) having link connection 448 with a pair of carriage lifters 449. The carriage lifters are provided with slots at their forward ends by which they are pivotally mounted on pins on the inner sides of the right and left side frames respectively of the machine. The rearward ends of the lifters 449 are provided with hook end portions adapted to fit under and over an inwardly turned shelf located at the front of and extending the length of the carriage 2.

Rocking of shaft 446 will, therefore, raise arms 447 and through the link connections raise the carriage lifters, thereby lifting the carriage, which is pivotally mounted at its rear, to partly unmesh the intermediate gears in the carriage from those in the body of the machine. As will be readily understood, the carriage will be in sliding engagement with the lifters during the shift, at which time said lifters perform the function of supports and guides. Also, it will be seen that the lift cam 443 is arrested in its rotation (Fig. 7) in position to hold the carriage in raised position during the shift, which will be continuous as long as a shift key is held depressed; or until the carriage has been shifted into a position indicated by a set tabulating key 402 (Fig. 15); or to either of its extreme positions, as will be hereinafter described.

Figure 8:
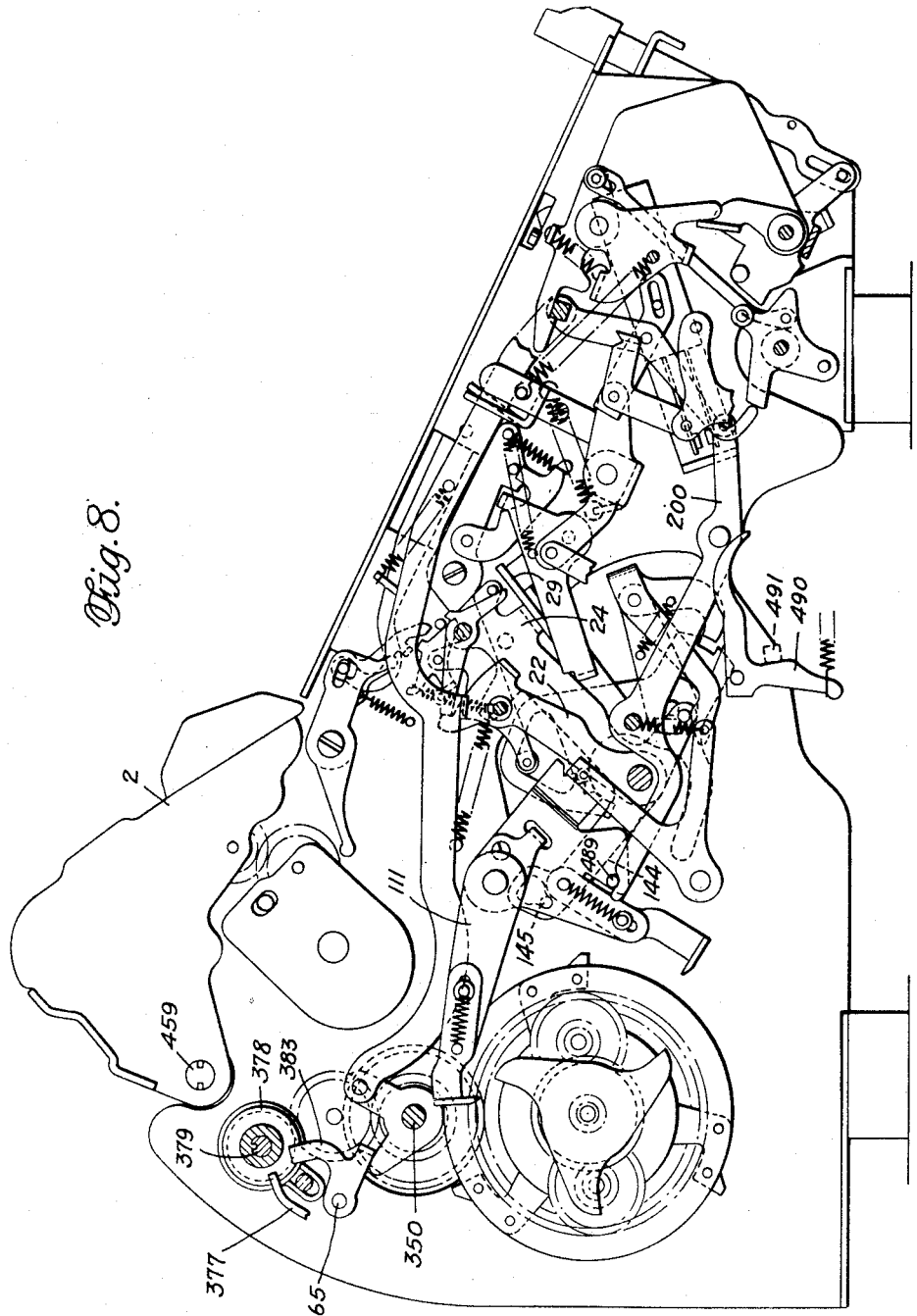
Figure 8 is a left side elevation of the machine showing in part the differential drive mechanism and the controls therefor.

Release of shift key 369 or 370 will bring about the termination of the shift, whereupon the one-cycle clutch 371 will complete its cycle for the purpose of normalizing the several parts. To this end, when toggle 362 is broken to initiate a shift, adjustment of the mechanism takes place as follows:

When toggle 362 is broken, slide 376 (Fig. 6) is moved to the right, as heretofore described, carrying an arm 377 integral therewith out of restraining engagement with a disk 378, fixed upon a sleeve which is splined to the shaft 379 of the shifting worm 358. Disk 386 secured to the opposite end of this sleeve is provided with a pin 380 (Figs. 7 and 16), normally lying to the left of tripping arm 381, pivotally mounted with clutch detent 373 on a common shaft. The detent 373 and tripping arm 381 have pin and slot connection, and an upstanding arm of the detent and the tripping arm have attachment to the respective ends of a spring 451, which urges them towards each other to the limit of the pin and slot connection. As heretofore described, the arm of the detent 373 has a roller which normally engages a slot in disk 386 and is removed therefrom when the detent acts to arrest the rotation of the clutch 371 following its engagement by lifting the detent 442 from engagement with the pawl of the clutch. A spring urges disk 378 and the associated parts towards the right (Fig. 6), but the disk is restrained, after the removal of the restraint of arm 377, by engagement with a crank arm 383, more clearly shown in Fig. 8. Crank arm 383 is secured upon shift initiating shaft 365, which is rocked upon depression of a shift key and thus rocks the arm 383 into the path of movement of the disk 378. As movement of the disks 378 and 386 to the right acts to terminate the shift, restraining crank arm 383 provides for continuous shifting until the carriage has reached a position indicated by a set tabulator key 402; or to an extreme position; or until the shift key is released.

Upon release of the shift key, shaft 365 will be restored by counterclockwise rotation of latch lever 439 (Fig. 4), under the influence of spring 452, thereby removing crank arm 383 from the path of disk 378. Spring urged disk 378 will now move to the right as viewed in Fig. 6, and with it disk 386 and pin 380 until blocked by contact with tripping arm 381. As shaft 379 of worm 358 completes its cycle of operation, pin 380 will contact one of the two opposed cam faces of tripping arm 381 (Fig. 7), rocking said arm clockwise against the tension of spring 450 and putting detent 373 under tension of spring 451, thereby biasing the roller of the arm of said detent against the periphery of disk 386. This relative movement between the tripping arm 381 and detent 373 is allowed by the pin and slot connection therebetween. As this movement reaches its maximum, the shift worm reaches its full cycle position, at which time the slot in disk 386 is in registration with the roller on the arm of detent 373 and said roller is urged to enter the slot by tensioned spring 451. In order to insure this action and prevent the worm from running past full cycle position, tripping arm 381 is provided with an extension 387 (Figs. 6 and 7). When the tripping arm is moved by pin 380, the extension 387 is moved into the path of a pin 388, which is fixed in a disk rotating with shaft 379, thereby preventing movement of the shaft beyond full cycle position. As the shaft may be rotating in either direction, pin 388 may engage extension 387 on either side thereof, for which reason is disk to which pin 388 is fixed has pin and slot lost motion driving connection with gear 357, fast on shaft 379. When the roller on the arm of detent 373 enters the slot in disk 386, said detent is removed from engagement with the pawl of clutch 371, permitting the reengagement of the clutch to complete its cycle of operation to normalize the several parts. In this connection, it will be noted that the toggle 362 must be reset to disengage the friction clutch 353 and engage clutch 352 and that the clutch lever 111 (Fig. 8) must be disengaged. Also the carriage must be lowered to its normal position. Furthermore, it will be observed that, although the plus or minus bar is depressed and released with the related shift key, arm 22 will not rock during a shifting operation, and therefore the tripping of the trigger 31, as the plus or minus bar is released, will be ineffective. Disengagement of clutch lever 111, lowering of the carriage and resetting of toggle 362 is accomplished by the clutch 371 as follows:

The clutch 371 is provided with cams 372 and 391 secured to the driven member of said clutch. Upon rotation of clutch 371 in its second step of movement, cam 391 (Fig. 7) will engage a roller on an arm of bell crank lever 441, rocking said lever counterclockwise, thereby through the link connection rocking bell crank lever 440 counterclockwise (Fig. 6) to move the slide 376 to the left and reset the toggle 362. Also detent 442 will now be urged inwardly by spring 453. When slide 376 is moved to the left, disk 386 and pin 380 are removed from engagement with tripping arm 381, allowing the arm to be rocked counterclockwise by spring 450, urging detent 373 through the pin and slot connection, against the periphery of the driven member of the clutch 371. In this connection, it will be noted that the roller on the arm of the detent 373 will be moved outward from the bottom of the slot in disk 386 but not removed, thus holding the shift worm 358 in locked full cycle position (Fig. 16). During this second step of rotation of the clutch 371, the clutch lever 111 will be restored to its neutral position by operation of cam 372. To this end, arm 454 (Figs. 12 and 16), pivotally mounted to the frame of the machine, is provided with a roller held in contact with cam 372 by action of a spring attached to said arm. A second arm 455 having common pivotal mounting with arm 454 is provided with a latch 456, the upstanding end of which is normally in the path of movement of a pin in arm 454, so that arm 455 will be rocked in unison with arm 454. Arm 455 will, therefore, be rocked clockwise (Figs. 12 and 16) upon rotation of clutch 371 in its second step of movement. An upstanding extension of arm 455 will thus contact a lug on link 424 attached to the full cycle arm 24 at its forward end, and move the link toward the front of the machine, thus rocking arm 24 clockwise about its pivot, raising the cam extension 144 (Fig. 8) into contact with the pin 145 of clutch lever 111, and thereby centralizing the clutch lever. At this point, it will be noted that the circuit breaker to the motor has been broken, and although clutch 371 has not yet reached its full cycle position, cams 372 and 391 have completed their work and the clutch through momentum will be free to coast to the completion of its cycle, where the drive will be disengaged by detent 442. Also, clutch 353 is still in engagement when the shift worm 358 is stopped and therefore a momentary slippage of the clutch will take place as toggle 362 is being reset. Furthermore, as the clutch 371 completes its cycle of operation it will be seen that the cam 443 will allow the carriage 2 to be lowered to its normal position under the urge of spring 457 (Fig. 4).

*Carriage shift (last place stop and tabulating keys)*

Should the right shift key 339 or left shift key 373 be held depressed until the carriage is shifted into either of its extreme positions, shift initiating shaft 365 will be restored to normal, whereby the drive is terminated in the same manner as described when the shaft 365 is restored to normal upon release of the shift key. For this purpose, two lugs 460 (Figs. 4, 13, 14, 15) are located on the rear of carriage 2 and so spaced that the nose of plunger 438 mounted on arm 367 is positioned just below one or the other of the lugs when the carriage is in either of its extreme shifted positions. Should the carriage be in the extreme right hand position, for example, and the left shift key be depressed (Fig. 13), the plunger, which is spring urged to its normal position (Fig. 4), will be depressed by contact with the lug 460 when arm 367 is raised and the shift initiated. When the carriage has shifted from the extreme right hand position, the lug 460 will be removed from contact with the plunger 438 and said plunger will be spring urged to its extended position. As the carriage is shifted into the extreme left hand position, the nose of the plunger will ride outward on the inclined cam edge 460' of the lug 460, thus moving arm 367 to the rear against the tension of its spring (Fig. 14). This movement of arm 367 will remove shoulder 367' from restraining engagement with latch lever 439, allowing the lever and rock shaft 365 to be spring urged counterclockwise to normal and thus open the carriage shift clutch and terminate the shift. When the shift key is finally released, the plunger 438 will drop below lug 460 and arm 367 will be urged forward by its spring, locating the shoulder 367' in its normal position below the forward end of latch lever 439 (Fig. 4). Termination of the shift at the extreme position in the opposite direction is, as will be readily understood, accomplished in the same manner. Should a shift key be depressed while the carriage is in the extreme position of the indicated shift, a shift will be initiated, but as the plunger 359 is at the end of the worm 358 the drive will be ineffective to move the carriage. However, the plunger 359, which is spring urged within the groove of the worm 358, will be raised to ride over the outer diameter of the worm by the eccentric conformation of the worm at either end, as will be seen in Figs. 2 and 6.

The tabulating keys 402, one for each order intermediate the extreme right and left hand carriage shift positions, are located on the rear of the carriage intermediate the lugs 460 (Fig. 15). The lower end 461 of each key 402 is bent outwardly from the carriage to form a lug at substantially the same angle as the lugs 460, and is provided with a pair of oppositely inclined cam edges which are adapted to displace plunger 438 in the same manner as described in connection with the inclined cam edges 460' of the lugs 460. In the unset position of the keys 402, the end lugs 461 are raised above and out of range of the plunger 438 when a shift key is depressed. However, when one of the keys 402 is depressed, its end lug 461 is brought into the same plane as the lugs 460 and should the carriage be shifted either to the right or left the arm 367 will be displaced pivotally against the tension of its spring by contact of the nose of the plunger 438 with one or the other of the cam edges of the lug 461 of the set tabulator key to terminate the shift in the same manner as that previously described in connection with the lugs 460 of the carriage. It will be noted that upon termination of the carriage shift said arm 367 will be held in rearwardly displaced position by contact of the nose of plunger 438 with the lug 461 of the set key. However, upon release of the shift key said arm 367 will be restored by its spring, shoulder 367' of said arm will be located below the forward end of latch lever 439 and said plunger 438 will be located below the lug 461 of the set key. The plunger 438 being thus restored to normal lowered position and the carriage being still located in the order indicated by the set tabulator key, upon depression of either shift key and consequent raising of said arm 367, the plunger 438 will be depressed against the tension of its spring by contact with the overlying lug 461 of the set key so that there will be no interference with the raising of the arm 367 in initiating the shift. The carriage being thus shifted into a new order, the lug 461 of the set key will no longer overlie said plunger 438, which latter will be restored to normal extended position by its spring and thus conditioned to contact one or the other of the end lugs 460 of the carriage to terminate the shift in either extreme position thereof. As will be noted in Fig. 15, a depressed key 402 is latched in set position by a lug 462', one of which is provided for each key on slide 462 which is spring urged to the left. Upon depression of one or the other of the tabulator keys 402 and before it is latched, an inclined edge of the key stem will, by contact with its lug, cam the locking slide 462 to the right, allowing the previously set key to be restored by a suitable spring to normal. An additional key 403 is provided which functions in like manner to unset anyone of the tabulator keys 402, thereby providing for extreme shift in either direction.

*Upper dial, lower dial and keyboard clear-out mechanism*

Figure 17:
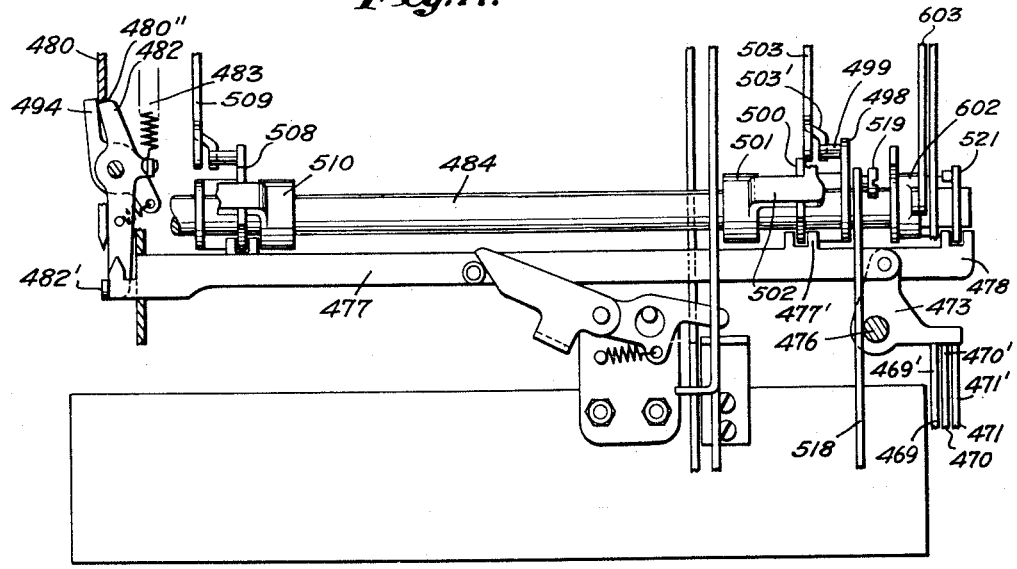
Figure 17 is a fragmentary view of portions of the clearout mechanism.
Figure 18:
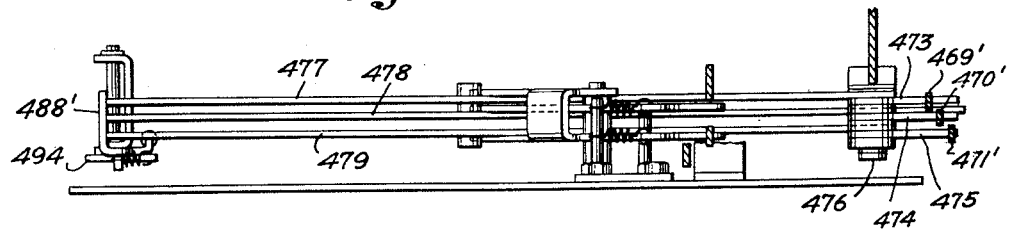
Figure 18 is a front elevation of the parts shown in Figure 17.

The machine is provided with a one cycle clutch 464 (Figs. 12 and 16) which is selectively operated to return to zero the upper dials 85 comprising the multiplier-quotient register, the lower dials 13 comprising the dividend-product register (Fig. 1), or to restore keys 18 which may be set on the keyboard 10. An upper dial clear key 465, a lower dial clear key 467 and a keyboard clear key 466 are grouped on the lower right hand side of the keyboard 10 (Fig. 1). A fourth key 468 completes the key grouping and is adapted for simultaneous depression with the keys 465, 466 and 467 to initiate certain machine operations hereinafter described. The depression of any one of the keys 465, 466, or 467 serves to engage the clutch 464 and to select the operation it will perform. The keys, however, are adapted to be depressed simultaneously, whereby the clutch 464 will operate a single cycle to simultaneously clear the indicated dials and/or keyboard as follows:

Each of the stems of the clear keys 465, 466 and 467 is pivotally connected at its lower end to the forward ends respectively of levers 469, 470 and 471 which are fulcrumed, one behind the other, at their rear on a stud 472 fixed on the right hand side frame. Lever 471 is shown in its entirety in Fig. 9 and levers 469 and 470 are of like configuration. The levers 469, 470 and 471 are provided with depending arms which terminate in horizontally disposed fingers 469', 470' and 471' respectively, which are adapted for contact each with an arm of bell crank levers 473, 474, and 475 respectively. The bell crank levers are fulcrumed on a vertical shaft 476 (Fig. 18), suitably fixed and depending from a cut-out section of the right hand side frame. The bell crank levers 473, 474 and 475 are pivotally connected to slides 477, 478 and 479 respectively, which slides extend across the machine (Figs. 17, 18 and 19). Thus depression of any one of the clear keys 465, 466 or 467 will rock its associated lever counterclockwise (Fig. 9) about the stud 472 and the finger 469', 470' or 471' will rock bell crank lever 473, 474 or 475 counterclockwise, thus moving slide 477, 478 or 479 to the left. The movement of any one of the slides to the left either singly or simultaneously with either one or both of the other slides releases a double latch 482 (Fig. 17) which allows the clearout clutch 464 to be engaged and selects the operation or operations to be powered by the clearout clutch. The double latch 482, which is normally in engagement with a shoulder 480' of a slide 480 (Figs. 12 and 17), holds said slide in its rearward position against the tension of a spring 481. The slide 480 is slidably supported at its forward end on a shaft 484 which extends across the machine and projects externally of the left hand side frame, and is pivotally connected at its rearward end to an arm 485 fixed on shaft 486, which shaft is rotatably mounted in the side frame. The leftward ends of slides 477, 478 and 479 are in abutment with an upstanding ear 482' of latch 482 (Figs. 17 and 18). Thus movement of one or more of the slides to the left will rock latch lever 482 clockwise about its fulcrum against tension of spring 483, releasing slide 480, which will be pulled forward by its spring 481. The left hand ends of the slides 477, 478 and 479 are each provided with a recess and when a slide 477, 478 or 479 is moved to its active position, the forward end of released slide 480 will enter such recess and hold the slide 477, 478 or 479 in set position until the engaging end of slide 480 has been removed, when said slide 477, 478 or 479 will be restored to latched position. Clear-out clutch 464 is driven by a suitable gear train 463 from the electric motor and is of well-known construction in which a spring pawl mounted on the driven member of the clutch is held out of engagement with the driving member by a detent. For this purpose a detent 487 (Figs. 12 and 16) is fixed on shaft 486 and when the slide 480 is released and pulled forward by its spring, the shaft 486 through arm 485 will be rocked counterclockwise, thus removing detent 487 from engagement with the pawl of clutch 464, thereby engaging the drive to the motor. The detent 487 is provided with an extension 488, the free end of which is provided with an open-end slot which is adapted for engagement with a pin 489 (Fig. 8) on clutch lever 111 when the detent is disengaged and the clutch lever is in neutral position. Thus it will be seen that if a clear-out key 465, 466 or 467 is depressed while the clutch lever 111 is in either of its active positions, the clear-out clutch 464 will not be disengaged, as the extension 488 will be blocked by contact with the pin 489, thus preventing detent 487 from disengaging the pawl of the clear-out clutch. However, extension 488 is allowed a degree of movement insufficient to disengage detent 487 before being blocked by pin 489 but sufficient to allow slide 480 to move forward far enough to carry shoulder 480' past the restraining arm of latch 482. Furthermore, the forward movement of slide 480 is sufficient to carry its forward end into partial latching engagement with the recess of the operated slide 477, 478 or 479. Thus it will be seen that even though a depressed clear key 465, 466, or 467 be released while the clutch lever 111 is engaged, when said lever 111 is returned to neutral, the slide 480 will complete its forward movement to cause engagement of the clear-out clutch 464. Upon engagement of the clear-out clutch the circuit breaker for the electric motor must be closed. For this purpose, a lever 490 (Fig. 8) fulcrumed on the frame is urged counterclockwise by a suitable spring. A horizontally disposed arm of the lever 490 is in contact with a pin on the arm 200 (Fig. 8) and the lever is restrained from rotation by a lug 491 on the slide 480 in blocking contact with a depending arm of the lever 490. When the slide 480 is released to move forward, the lever 490 is urged counterclockwise by its spring and the forward end of lever 200 is lifted to close the circuit breaker.

In order that the clutch 464 shall make one cycle of operation and then be disengaged, provision is made to return the detent 487 into position to engage the pawl of the clutch before the clutch has completed its cycle. To this end, the detent 487 is provided with an extension 492 (Figs. 12 and 16), the free end of which is provided with a cam face 492'. When the detent 487 is disengaged (Fig. 12), the free end of the arm 492 is moved downwardly, thus bringing the cam face 492' into position to be engaged by a pin 493 mounted on the driven member of the clutch 464. As the clutch 464 approaches its full cycle position, the pin 493 will contact cam face 492', raising arm 492 and thus moving detent 487 into position where it will engage the pawl of the clutch 464 and disconnect the drive when the clutch reaches full cycle position. As the detent 487 is fast on shaft 486, the shaft will be rocked clockwise, carrying arm 485 (Fig. 12) with it and moving slide 480 to the rear. The pin 493 of clutch 464 will pass under the cam face 492', providing sufficient movement to bring the shoulder 480' of the slide 480 to the rear of the restraining arm of latch 482, which will be urged into latching position by spring 483. The slide 480 will then be urged forward by its spring into contact with the latch 482 and the arm 492 moved slightly downward (Fig. 16). The latch 482 operates as above described only if the clear-out keys 465, 466 and 467 have been released before the completion of the clear-out cycle. If the clear-out keys have been released, the ear 482' abutting the ends of the setting slides 477, 478 and 479 will move said slides to the right to their unset position. However, should a clear key be held depressed a setting slide will be held to the left and by contact with ear 482' hold the latch in clockwise rocked position out of the path of the shoulder 480' of slide 480 (Fig. 17). In this instance, a latch lever 494 having a common fulcrum with latch lever 482 will be urged clockwise by spring connection with latch lever 482, thus positioning it in the path of the shoulder of slide 480 and preventing forward movement of the slide. When the clear-out keys are released, the latch lever 482 will then be free to be moved counterclockwise by spring 483 and return the slides 477, 478 or 479 to normal. As latch lever 482 is moved counterclockwise it will, by contact with latch lever 494, move the latter out of latching engagement with slide 480 and itself be moved into latching position, thereby restraining said slide 480 from forward movement (Fig. 17).

The clutch 464, during the foregoing cycle of operation, provides the power to operate the mechanism adjusted to active position by one or more of the setting slides 477, 478 and 479. To this end, the driven member of the clutch 464 is provided with an eccentric cam 495 (Fig. 16). The eccentric cam is adapted to impart a reciprocatory movement to a link 496 (Fig. 16) which is pivotally connected at its forward end to a crank arm 497 which is fixed on the shaft 484 which extends across the machine (Figs. 17 and 19). Thus when clutch 464 is engaged, the shaft 484 is rocked clockwise (Fig. 16), counterclockwise (Fig. 19), during the first half of the cycle and during the second half of the cycle is rocked back to normal.

Slidably mounted on shaft 484 and positioned to the left of the right hand side frame, is a rearwardly extending lever 498 (Figs. 17 and 19) having a pin 499 extending to the left thereof. Integral with lever 498 and positioned to the left in spaced relationship thereto is a member 500 provided with an upstanding portion having an open-end slot. Further to the left and fixed on shaft 484 is a collar 501 provided with an arm 502 extending to the right thereof and seated in the open-end slot of member 500. Fulcrumed on shaft 466 is a lever 503 (similar to lever 509, Fig. 2), the forward end of which is provided with an open-end slot the bottom of which is defined by an ear 503' which is offset to the right (Fig. 17). Normally the forward end of lever 503 is held downwardly by a rearwardly extending finger 502' (Fig. 19) of the extension 502 of collar 501, the pin of lever 498 being positioned just above and out of contact with the ear 503'. However, depression of clear-out key 465, which will initiate the operation which will restore the upper dials 85 to zero, will, as heretofore described, move setting slide 477 to the left. Slide 477 (Fig. 17) is provided with a projection 477' (Figs. 17 and 19) having an open-end slot which engages the rim of member 500. Thus member 500 and lever 498 are moved to the left and the pin thereof into engagement with lever 503 through the slot in the forward end thereof. When shaft 484 is rocked by clear-out clutch 464, arm 498 will therefore be rocked through arm 502 of collar 501, thus raising the forward end of the lever 503. The rearward end of lever 503 is pivotally connected to the lower end of a link 504 (Figs. 2 and 19) which latter is pivoted at its upper end to an arm 505 (Fig. 2) splined on the carriage shaft 469 and provided with a suitable bearing in the right hand side frame of the machine (Fig. 2). Thus as the rearward end of lever 503 is lowered shaft 469 will be rocked clockwise and through suitable linkage 506, shaft 507 mounted in the carriage will likewise be rocked clockwise. The rocking of shaft 507 will serve to return to zero the cycle counting wheels 85 (Fig. 1) in the manner fully disclosed in Patent No. 1,781,320 to L. P. Crosman. As shaft 484 is rocked clockwise back to normal, the pin of arm 499 (Fig. 17) by contact with ear 503' will move the forward end of lever 503 downwardly and at the end of the movement the finger 502' will further depress said lever, lowering ear 503' slightly below the pin of arm 498, at which time slide 477 will be restored to its normal position if key 465 has been released. However, if key 465 is held depressed, the restoration of the slide 477 will take place upon release of said key. Should one or the other of the setting slides 478 or 479 be moved to the left to initiate a cycle of clear-out clutch 464 while slide 477 is in its normal position, the rocking movement of arm 498 will be ineffective to clear the cycle counting wheels 85, as the pin of said arm is out of engagement with the slot in the forward end of lever 503.

The parts adjusted to active position by depression of key 467 and leftward movement of slide 479 for clearing the lower dials 13 to zero are of similar construction to that for the upper dials 85. An arm 508 on shaft 484 (Figs. 2, 17, and 19) provided with a pin, is moved on said shaft into engagement with a lever 509, said lever being actuated by an arm of a collar 510 which is fixed on shaft 484. The rearward end of lever 509 is pivotally connected to a link 511 (Figs. 2, 11 and 12) which link is pivotally connected to an arm 512 splined on the carriage shaft 459, and provided with a suitable bearing in the left hand side frame of the machine. Hence, when shaft 459 is rocked clockwise (Fig. 11), shaft 513 will, through suitable linkage 514 likewise be rocked clockwise and the totalizer wheels 13 (Fig. 1) be zeroized in accordance with the above-mentioned Patent No. 1,781,320.

As it is necessary that the intermediate gears in the carriage be out of mesh with the intermediate gears in the machine body (Fig. 16) when wheels 13 are cleared, a clear-out cycle of clutch 464 operates to raise the forward end of the carriage. A cam 522 (Fig. 16) rotated with the driven member of clutch 464 serves to depress an arm 523 at the beginning of a clear-out cycle. Arm 523 is fast on shaft 446 and as said shaft is rocked counterclockwise, the carriage 2 is lifted through arms 447, links 448 and lifters 449 (Fig. 11) in the same manner as previously described in connection with carriage shifting. As clutch 464 approaches its full cycle position, arm 523 is allowed to move upwardly as spring 457 connected to arm 458 of shaft 446 (Fig. 4)

pulls the carriage downwardly into its normal position.

The depression of the clear-out key 466 will initiate the operation to clear the keyboard 10 of values which may be set up by depressed keys 18 as follows:

The keyboard construction is of the well known type in which a set key 18 in any order is latched in depressed position by a bail 432 (Fig. 2), and in which the depression of another key in that order will move the bail to release the set key, the key which is now depressed being in turn latched in set position by said bail. Accordingly, provision is made to simultaneously depress the row of keys 18 extending across the front of the keyboard, one being provided for each order. Depression of these keys 18 which designate a zero value serves only to move the bails 432, thereby releasing the set keys in each order, allowing the setting slides 19 (Fig. 2) to return to normal and removing the values which may be set up on the actuator gears 5. The stem of each of the zero keys 18 terminates at its lower end in a horizontally disposed portion (Fig. 2). Extending across the machine is a bail 515 pivotally mounted on a shaft 516. The rearward edge of bail 515 overlies the horizontal lower ends of the zero keys 18 and is in contact therewith when the keys are in released position. Thus, it will be seen that when bail 515 is rocked clockwise the zero keys 18 will be depressed, thereby releasing the value keys 18 which may be set in each order. The zero keys 18 will then be held in latched position by the bails 432. The bail 515 is provided at its right hand end with a depending arm 517 (Fig. 9) adjacent the inner wall of the right hand side frame. A push link 518 (Figs. 9 and 19) is pivotally connected to the arm 517 and extends rearwardly and in sliding contact with the inner wall of the right hand side frame. Mounted on the rear end of link 518 is a stud 519 extending through a horizontally disposed slot in the side frame and provided with an enlarged head which prevents lateral displacement of the link 518. The stud 519 is normally urged against the rear end of the slot in the side frame by a spring 520 (Fig. 9) through link 518 which is connected to the lower end of arm 517 of bail 515, thus maintaining said bail in its normal unrocked position. The shaft 484 extends through the right hand side frame externally thereof and is provided with a squared end portion upon which is slidably mounted a member 521 (Figs. 9 and 19). Member 521 is provided with an upstanding lug 521' normally positioned to the right and rear of the head of stud 519. Clear-out slide 478 extends to the right beyond the side frame and terminates in a rearward projection provided with a slot which engages the rim of member 521. Therefore, when the clear-out key 466 is depressed and slide 478 moved to the left, the lug 521' of the member 521 will be brought into the plane of the head of stud 519. As the shaft 484 is rocked counterclockwise by action of clear-out clutch 464, member 521 is also rocked and lug 521' will contact the head of stud 519 moving it forward in the slot in the side frame. Thus bail 515 is rocked to clear the keyboard through arm 517 and push link 518 on the rear end of which the stud 519 is mounted.

*Tabulating keys*

It will be noted from an inspection of the drawings (Figs. 4, 13, and 14) that the operating connection between latch lever 439 and latch arm 367 permits movement of lever 439 and the parts connected therewith to shift initiating position independently and without displacement of arm 367. As fully disclosed in applicant's co-pending application, Serial No. 8,548, such independent movement is effected in the shift initiating operations incident to programs of multiplication and division. It will be apparent, therefore, that any set tabulator key 402 will be effective to interrupt a shifting operation only when initiated by depression of the shift keys which operate to move plunger 438 of arm 367 into the path of the lug of the set tabulator key.

In the calculation of problems in division, it is often desirable to begin a calculation with carriage 2 positioned intermediately of its extreme positions. Accordingly provision is made for shifting the carriage to the right to the desired position indicated by a set tabulating key 402. The shift is initiated by automatic depression of right shift key 369, and therefore when carriage 2 is shifted to the position indicated by the set tabulating key 402, the shift will be terminated. The foregoing is accomplished as follows:

A clear-out cycle of clutch 464 (Fig. 1) initiated by the simultaneous depression of any one or more of the clear-out keys 465, 466 and 467 with key 468 (Fig. 1) will automatically bring about depression of right shift key 369. However, as it is desirable to clear the multiplier-quotient register 85, product-dividend register 13, and keyboard 10 for the setting of the factors and registration of the result of the calculation to be performed, the simultaneous depression of keys 465, 466, 467 and 468 would be the logical operation. To facilitate this operation, the keys are grouped at the right hand corner of the keyboard (Fig. 1). It may be well to note at this point that the depression of key 468 alone will not effect the carriage shift operation as will presently appear.

A slide 595 (Fig. 19) is adapted for two settings; namely, right shift and left shift. However, for the purpose of the present disclosure, the operation is described in connection with the right shift setting as shown in the drawings, and the means whereby the setting of slide 595 is accomplished forms no part of the present invention. Also, it will be readily understood that when slide 595 is set for left shift, the operation hereinafter described will bring about a left shift and the shift will be terminated in the position indicated by a set tabulating key 402.

Slide 595 is mounted on the inner face of the right hand side frame of the machine. Mounted (or anchored) on the rear end of and extending downwardly from slide 595 is the tightly wound coiled spring 596 (Fig. 19). The lower end of spring 596 is not anchored but extends downwardly through a hole located at the end of an inwardly extending arm of a rocker 597. Rocker 597 is pivotally mounted on a bracket (Fig. 9) which is mounted on the outer face of the right hand side frame, and its inwardly extending arm, which has connection with spring 596, passes through a suitable opening in the side frame. Rocker 597 is adapted to be rocked in a plane substantially parallel to that of the keyboard, but is normally held in its central position by a lever 598 constituting a primary latch (Fig. 4). Lever 598 is fulcrumed on stud 594, which extends outwardly from the right hand side frame, and said lever is provided at its rearward end with a recess 598' in the lower edge thereof. When the rearward end of lever 598 is held downwardly in its normal position by spring 599 (Fig. 4), an outwardly extending arm of rocker 597 is positioned within the recess 598', thereby preventing rocker 597 from being moved from its central position.

A lever 600 (Figs. 9 and 19), for a purpose to be described, is fulcrumed on the outer face of the right hand side frame at 600' and is provided with a downwardly extending arm which terminates in an inwardly bent portion adjacent the inwardly extending arm of rocker 597 and has slot connection with the lower end of spring 596. Lever 600 is further provided with a rearwardly extending arm which by contact with a lug 601' of a stop 601 (Fig. 19) will prevent said lever from counterclockwise movement when carriage 2 is in the extreme left hand position and from clockwise movement by contact with a lug 601'' of said stop when the carriage is in the extreme right hand position. However, when carriage 2 is in an intermediate position, stop 601 will be centrally positioned with lugs 601' and 601'' at opposite sides of lever 600 and will be ineffective to prevent movement of said lever in either direction, as will hereinafter be described.

From an inspection of Fig. 19, it will be seen that the upper end of spring 596 is displaced to the left of the lower end of the spring which has connection with rocker 597 and lever 600. Therefore, rocker 597 (Fig. 19) will be urged in a counterclockwise direction and lever 600 in clockwise direction as spring 596 tends to assume a straight line position to the left. However, rocker 597 is restrained from movement by the recess 598' of lever 598, and spring 596 will remain at this time with its lower end displaced from alignment with its upper end.

In connection with a clear-out cycle initiated by depression of keys 465, 466 or 467 as described, shaft 484 (Figs. 9 and 19) is rocked counterclockwise, and then clockwise back to normal, the clockwise movement being effective to clear the indicated wheels or keyboard. A crank arm 602 (Figs. 9 and 19) fixed on shaft 484 has yieldable link connection 603 with a depending crank arm 604 (Fig. 9) which latter is integral with a rearwardly disposed hub of an arm 605. The hub of arm 605 is provided with a circumferential slot and is rotatably mounted and adapted for lateral displacement on a stub shaft 606 extending outwardly from the right hand side frame. A pin in the end of a forwardly extending arm of rocker 597 is positioned in the slot of the hub of arm 605. Thus it will be seen from an inspection of Fig. 19 that when rocker 597 is rocked in either direction, arm 605 will be moved laterally either to the right or the left on shaft 606. The forward end of crank arm 605 (Figs. 9 and 19) is normally positioned between and laterally spaced from lateral pins 369' and 370' which are located in the lower ends of the stems of the right and left carriage shift keys 369 and 370 respectively. Thus, when a clear-out cycle is initiated by depression of one of the keys 465, 466 or 467, shaft 484 through crank 602, link 603 and crank 604 will rock arm 605 clockwise (Fig. 9) to a position above pins 369' and 370' and back counterclockwise to normal without contacting the said pins. However, when key 468 (Fig. 4) is depressed simultaneously with keys 465, 466 and 467 to effect a right carriage shift operation, a lever 607 having pivotal connection at its forward end with the lower end of the stem of key 468 is rocked counterclockwise about its fulcrum on shaft 594. Lever 607 is disposed to the rear of lever 598 and has at its rearward end a forwardly extending lug 607' (Figs 4 and 5) which underlies and is normally in contact with the lower edge of lever 598. Thus when lever 607 is rocked counterclockwise, lever 598 is likewise rocked by lug 607'.

A secondary latch 611 (Figs. 4 and 5) is provided to hold latch lever 598 in rocked position during the clear-out cycle which will initiate the carriage shift. This is necessary, as release of key 468 (Fig. 4) prior to completion of the clear-out cycle would allow recess 598' of lever 598 to reengage the arm of rocker 597, thus holding the rocker in its central position and prevent the initiation of the carriage shift as will appear. Bell crank levers 473, 474 and 475 respectively (Fig. 19) are rocked counterclockwise upon depression of clear-out keys 465, 466 and 467 as described in connection with the clear-out operation. Outwardly extending arms of the bell crank levers are thus moved to the right (Fig. 5) and by contact with a depending arm of a lever 612 will rock the lever counterclockwise about its fulcrum against the tension of a suitable spring. Lever 612 is provided with another arm which has spring connection with a forwardly extending arm of latch 611. Thus, when lever 598 is rocked, secondary latch 611 (Fig. 5) will be urged clockwise beneath lug 610, holding primary latch lever 598 in rocked position when lever 607 (Figs. 4 and 5) is restored upon release of key 468.

When primary latch lever 598 (Fig. 5) has been so rocked, recess 598' is removed from restraining engagement with the outwardly extending arm of rocker 597. Spring 596 (Fig. 19), which is conditioned to move rocker 597 in a counterclockwise direction and lever 600 in clockwise direction, will act accordingly. However, as rocker 597 through its pin connection with crank arm 605 moves said arm laterally to the right (Figs. 10 and 19) on shaft 606, no appreciable movement is effected as the rightward lateral face of arm 605 is brought into abutment with the free end of pin 369' of the stem of the right shift key 369 (Fig. 10). As shaft 484 (Fig. 9) is rocked counterclockwise in the clear-out operation, arm 605 is rocked clockwise by the link connection 603, whereby the arm is raised above the pin 369' of right shift key 369. Accordingly, arm 605 is allowed further movement laterally to the right until restrained by the stem of key 369. Therefore, as shaft 484 is rocked clockwise back to normal, arm 605 will be rocked counterclockwise and by engagement with the upper side of the pin 369' of right shift key 369 will pull said key downwardly (Fig. 3) and latch it in depressed position, thereby initiating a right carriage shift.

Furthermore, as the clear-out cycle is completed, the arms of bell crank levers 473, 474, and 475 (Fig. 3) will be moved to the left and therefore lever 612 will be rocked clockwise by its spring to normal, thus removing secondary latch 611 from engagement with lug 610 of primary latch lever 598. However, when rocker 597 (Fig. 19) was moved counterclockwise, the outwardly extending arm thereof was moved to the right (Fig. 3) of recess 598' of primary latch lever 598. Accordingly, when lever 598 is released by latch 611, the lower edge of the lever 598 to the right of recess 598' will be brought to rest upon the outwardly extending arm of rocker 597. Thus lever 598 is held in rocked position.

Carriage 2 will be shifted to the right until a lug 431 (Fig. 15) of a set tabulating key 402 is moved into contact with plunger 438 (Fig. 14).

The carriage shift is thus terminated in the position indicated by the set tabulating key 402 in accordance with the operation of the carriage shift mechanism as described in connection with operation of shift keys 369 and 370.

Arm 24 (Figs. 8 and 12) is carried against the fixed stop 29 upon termination of the carriage shift as also described in connection with the carriage shift mechanism. Link 424 (Fig. 12) pivotally connected at its forward end to arm 24 and at its rear end to crank arm 425 fixed on shaft 426 is therefore moved towards the front of the machine and thus rocks shaft 426 counterclockwise. Shaft 426 extends across the machine and has suitable link connection 427 (Fig. 13) with a crank arm 427' fixed on the shaft to which the arm 429 is also fixed and therefore arm 429 is rocked in counterclockwise direction.

Rocker 597 (Fig. 19) is provided with an open-end slot extending to and flaring outwardly at the rear. As arm 429 is rocked counterclockwise, an extension 429' thereof will contact the flared entrance, thereby entering the slot of rocker 597 and moving it clockwise to its central position. Rocker 597 will therefore move arm 605 to the left (Figs. 10 and 19) out of latching engagement with pin 369' of the right shift key 369, thereby releasing said key. Furthermore, the outwardly extending arm of rocker 597 will be moved to the left from the position shown in Fig. 3, and the rear end of primary latch lever 598 will be moved downwardly by spring 599 to engage recess 598' with the outwardly extending arm of rocker 597. Thus when arm 24 (Fig. 8 and 12) is returned from the fixed stop 29 and arm 429 (Fig. 13) is restored to normal, rocker 597 will be locked by lever 598 (Fig. 4) in its central position.

It will readily be understood from the foregoing that if none of the tabulating keys 402 are set, carriage 2 will be shifted to the extreme right hand position, where fixed lug 460 (Fig. 15) will serve to terminate the shift in the same manner as described in connection with the lugs 461 of tabulating keys 402. Also, it will be apparent that if a tabulating key 402 is set in a position in which carriage 2 is at rest, the set tabulating key 402 will not interfere with the shift initiating operation, as plunger 438 (Fig. 13) will be depressed by lug 461 upon operation of a shift key without rearward displacement of arm 367.

Stop 601 (Fig. 19), as previously mentioned, serves to prevent movement of lever 600 and consequently the setting of arm 605 under certain operating conditions. As set forth in the foregoing, the release of a shift key 369 or 370 which is latched by arm 605 in depressed position, is effected by movement of arm 24 (Fig. 8) to fixed stop 29. Movement of arm 24 to fixed stop 29 is effected as an incident to the shift of carriage 2 into either of its extreme positions or into a position indicated by a set tabulating key 402 (Fig. 15). Consequently, if a shift key 369 or 370 were depressed and held by arm 605 (Figs. 9, 10 and 19) when carriage 2 is in the extreme position indicated by the depressed shift key, no movement of carriage 2 would be effected, and the key would be held depressed indefinitely. Accordingly, it is necessary to prevent effective movement of arm 605 to depress either shift key 369 or 370 if carriage 2 is in either of the extreme respective positions and key 468 (Figs. 1 and 4) is simultaneously depressed with one or more of the clear-out keys 465, 466 and 467 to effect a carriage shift in that direction. This is accomplished as follows:

Stop 601 (Figs. 9 and 19) is mounted at the end of a bar 613 which is slidably mounted in suitable slots at the upper rear of the side frames of the machine and extends beyond the frames at either end. The bar is centrally located by two springs 618, one of which is shown in Fig. 19. When carriage 2 is in any position intermediate the extreme right and left, bar 613 will be centrally located with spaced lugs 601' and 601'' of stop 601 at opposite sides of the rearward arm of lever 600. Thus lever 600 will be unrestrained from movement in either direction thereby permitting rocker 597 to be moved to effect the setting of arm 605. However, when carriage 2 is in the extreme left hand position, the head of a screw 615 (Fig. 19) mounted on the inner face of the right hand end plate of the carriage will be brought into contact with the end of bar 613, moving the bar to the left. This causes the upper lug 601' of stop 601 to be positioned over the end of the rearward arm of lever 600. Thus lever 600 is blocked from counterclockwise rotation and hence rocker 597 from clockwise movement (Fig. 19). As will be apparent, however, lever 600 will be free to be rocked in clockwise direction. Conversely, when the carriage is shifted into the extreme right hand position, the head of another screw 615 (not shown) mounted on the left hand end plate of the carriage will contact bar 613. Thus stop 601 will be moved to the right, thereby removing the upper lug 601' of stop 601 from blocking position with the rearwardly extending arm of lever 600, permitting counterclockwise rotation of said lever, and positioning the lower lug 601'' of stop 601 beneath said arm to prevent clockwise rotation of lever 600.

As disclosed in my co-pending application for patent Ser. No. 8,547, filed of even date herewith, the slide 595 is set for left carriage return shift upon depression of a multiplier key and is set for right carriage return shift upon depression of the division key, this setting of slide 595 remaining unchanged as long as multiplication or division operations are being performed.

In the event automatic shift of the carriage were to occur invariably in the clearout operation with which the present invention is associated, the latch lever 598 and parts necessarily included therewith may obviously be omitted.

For subject matter herein disclosed and not claimed, reference is made to applicant's copending applications, Serial No. 8,545 relating to constant factor means; Serial No. 8,547 relating to multiplier and dividend entering means; Serial No. 8,548 relating to registration and shift control; and Serial No. 57,943, relating to product transfer means.

I claim:

1. In a calculating machine, the combination of a denominationally shiftable carriage, having deflector elements, carriage shifting means, settable denominational tabulator keys on the carriage having deflector elements, right and left carriage shift keys means for initiating a carriage shift in one or alternatively the opposite direction upon depression of the related shift key, for effecting operation of the carriage shift means and for terminating the shift upon release of the key comprising a rock shaft, a spring-retracted link having connection with the shift keys, a spring-retracted latch fast upon said rock shaft and having latching engagement with said link to rock said shaft upon depression of a shift key to initiate the shift and to restore said latch and said shaft upon release of the key to terminate the shift, said link having a normally ineffective member settable to position to cooperate with the deflector elements of the tabulator keys upon depression of a carriage shift key to move said link against the tension of its spring to release the latching engagement of said link with said latch and restore said rock shaft to terminate the shift at the position indicated by a set tabulator key and similarly settable to cooperate with the deflector elements of the carriage to terminate the shift at either extreme position thereof.

2. In a calculating machine having a denominationally shiftable register carriage, reversible motor driven carriage shifting means, right and left carriage shift keys, and means controlled by said keys for initiating and maintaining operation of said carriage shift means in one or alternatively the opposite direction; in combination with means for operatively engaging one or alternatively the other of said shift keys comprising a member adjustable in one or the opposite direction, spring-powered means for adjusting said member comprising means selectively settable to condition said spring to adjust said member in one or in the opposite direction, an operation control key, and means controlled by said operation key and in train with the motor for operating said member to depress the shift key selected by the previous setting of said settable means and to hold the key depressed.

3. In a calculating machine having a denominationally shiftable register carriage, reversible motor driven carriage shifting means, right and left carriage shift keys, and means controlled by said keys for initiating and maintaining operation of said carriage shift means in one or alternatively the opposite direction; in combination with means for operatively engaging one or alternatively the other of said shift keys comprising a member adjustable in one or the opposite direction, spring-powered means for adjusting said member comprising means selectively settable to condition said spring for adjusting said member in one or the opposite direction, a latch to hold said member in neutral position against the tension of said spring, an operation control key, means comprising a key for releasing said latch, and means controlled by said operation key and in train with the motor for operating said member to depress the shift key selected by the previous setting of said settable means and to hold the key depressed upon conjoint depression of said operation key and said latch key.

4. In a calculating machine, having a denominationally shiftable register carriage, reversible motor driven carriage shifting means, right and left carriage shift keys, and means controlled by said keys for initiating and maintaining operation of said carriage shift means in one or alternatively the opposite direction; in combination with means for operatively engaging one or alternatively the other of said carriage shift keys comprising a member adjustable in one or alternatively the opposite direction, spring-powered means for adjusting said member comprising means selectively settable to condition said spring to adjust said member in one or the opposite direction, a latch to hold said member in neutral position against the tension of said spring, an operation control key, means comprising a key for releasing said latch, a one-cycle clutch in train with the motor, means controlled by said operation key for closing said clutch, and means controlled by said clutch for operating said member to depress the shift key selected by the previous setting of said settable means and to hold the key depressed upon conjoint depression of said operation key and said latch key.

5. In a calculating machine, having a denominationally shiftable register carriage, reversible motor driven carriage shifting means, right and left carriage shift keys, and means controlled by said keys for initiating and maintaining operation of said carriage shift means in one or alternatively the opposite direction; in combination with means for operatively engaging one or alternatively the other of the carriage shift keys comprising a member adjustable in one or the opposite direction, spring-powered means for adjusting said member comprising means selectively settable to condition said spring to adjust said member in one or the opposite direction, a primary latch for holding said member in neutral position against the tension of said spring, an operation control key, means comprising a key for releasing said latch, a one-cycle clutch in train with the motor, means controlled by said operation key for closing said clutch, means controlled by said clutch for operating said member to depress the shift key selected by the previous setting of said settable means and to hold the key depressed upon conjoint depression of said operation key and said latch key, and a secondary latch for holding said primary latch in released position.

6. In a calculating machine having a denominationally shiftable register carriage, reversible motor driven carriage shifting means, right and left carriage shift keys, and means controlled by said keys for initiating and maintaining operation of said carriage shift means in one or alternatively the opposite direction; in combination with means for operatively engaging one or alternatively the other of the shift keys comprising a pivotal member normally neutrally positioned opposite lateral pins of the shift keys and adjustable in one or the opposite direction, spring-powered means for adjusting said member comprising a pivotal rocker having connection with said member and a slide having torsion spring connection with said rocker and selectively settable to condition said spring to adjust said rocker and said member in one or the opposite direction, a latch for holding said rocker and said member in neutral position against the tension of said spring, an operation control key, means comprising a key for releasing said latch, a one-cycle clutch in train with the motor, means controlled by said operation key for closing said clutch, and means controlled by said clutch for oscillating said pivotal member to first raise it above the pin of the shift key selected by the previous setting of said slide and permit said spring to adjust said member laterally to overlie said pin and to thereafter depress said member to depress the shift key and for holding the key depressed upon conjoint depression of said operation key and said latch key.

7. In a calculating machine having a denominationally shiftable register carriage, reversible motor driven carriage shifting means, right and left carriage shift keys, and means controlled by said keys for initiating and maintaining operation of said carriage shift means in one or alternatively the opposite direction; in combination with means for operatively engaging one or alternatively the other of the shift keys comprising a member adjustable in one or the opposite direction, spring-powered means for adjusting said member comprising a pivotal rocker having connection with said member and a slide having torsion spring connection with said rocker and selectively settable to condition said spring to adjust said rocker and said member in one or the opposite direction, a latch for holding said rocker and said member in neutral position against the tension of said spring, an operation control key, means comprising a key for releasing said latch, means controlled by said operation key and in train with the motor for operating said member to depress the shift key selected by the previous setting of said slide and to hold the key depressed upon conjoint depression of said operation key and said latch key, and means for preventing the adjustment of said rocker and of said member upon shifting of the carriage to either extreme position thereof comprising an interponent having connection with said rocker and normally moving idly therewith and means controlled by said carriage for blocking movement of said interponent and adjustment of said rocker.

8. In a calculating machine having a denominationally shiftable register carriage, reversible motor driven carriage shifting means, right and left carriage shift keys, and means controlled by said keys for initiating and maintaining operation of said carriage shift means in one or alternatively the opposite direction comprising an element having operating connection with and movable by one or the other of the shift keys to shift initiating position; in combination with means for operatively engaging one or alternatively the other of the shift keys comprising a member adjustable in one or the opposite direction, spring-powered means for adjusting said member comprising means selectively settable to condition said spring to adjust said member in one or the opposite direction, a latch for holding said member in neutral position against the tension of said spring, an operation control key, means comprising a key for releasing said latch, means controlled by said operation key and in train with the motor for operating said member to depress the shift key selected by the previous setting of said settable means and to hold the key depressed upon conjoint depression of said operation key and said latch key, settable denominational tabulator keys on the carriage, and means controlled by said tabulator keys and in train with the motor for terminating the operation of said carriage shift means in one or alternatively the opposite direction comprising means for breaking said operating connection and restoring said element upon tabulation of the carriage to the position of a set tabulator key and for restoring said adjusting means and said member to neutral position to thereby release the depressed shift key, remake said operating connection and reengage said latch.

9. In a calculating machine having a denominationally shiftable register carriage, reversible motor driven carriage shifting means, right and left carriage shift keys, and means controlled by said keys for initiating and maintaining operation of the carriage shift means in one or alternatively the opposite direction comprising an element having operating connection with and being movable by one or the other of the shift keys to shift initiating position; in combination with means for operatively engaging one or alternatively the other of the shift keys comprising a member adjustable in one or the opposite direction, spring-powered means for adjusting said member comprising means selectively settable to condition said spring to adjust said member in one or the opposite direction, a primary latch for holding said member in neutral position against the tension of said spring, an operation control key, means comprising a key for releasing said latch, a secondary latch settable to hold said primary latch in released position, means controlled by said operation key and operable upon conjoint depression of said operation key and said latch key to set said secondary latch, means controlled by said operation key and in train with the motor for operating said member to depress the shift key selected by the previous setting of said settable means and to hold the key depressed upon conjoint depression of said operation key and said latch key, means controlled by said operation key for releasing said secondary latch, settable denominational tabulator keys on the carriage, and means controlled by said tabulator keys and in train with the motor for terminating the operation of said carriage shift means in one or alternatively the opposite direction comprising means for breaking said operating connection and restoring said element upon tabulation of the carriage to the position of a set tabulator key and for restoring said adjusting means and said member to neutral position to thereby release the depressed shift key, remake said operating connection and reengage said primary latch.

10. In a calculating machine having a denominationally shiftable register carriage and reversibel motor driven carriage shifting means; the combination of settable denominational tabulator keys on the carriage having cam lugs, right and left carriage shift keys, means controlled by said shift keys for initiating and maintaining operation of said shifting means in one or alternatively the opposite direction including an adjustable element, and a displaceable arm having operating connection with said element and pivotal connection with said shift keys; said arm being operable by one or alternatively the other of said shift keys to move and then hold said element in shift initiating position; and said arm being movable in the shift initiating operation into the path of the lug of a set tabulator key whereby said lug is rendered effective upon movement of the carriage in either direction into the denominational position of the set tabulator key to displace said arm thereby breaking the operating connection and releasing said element; and means operable to restore said element when released; with means for terminating operation of said shifting means in response to restoration of said element, and means for restoring said arm and remaking the operating connection with said element upon release of the operated shift key.

11. The invention according to claim 10 wherein the shiftable carriage is provided with a pair of cam lugs fixed thereon, and wherein the displaceable arm is movable in the shift initiating operation into the path of said fixed lugs thereby rendering said lugs effective upon movement of the carriage into one or the other extreme end position respectively to displace said arm.

12. In a calculating machine having a denominationally shiftable register carriage and reversible motor driven carriage shifting means; the combination of settable denominational tabulator keys on the carriage having cam lugs, right and left carriage shift keys, means controlled by said shift keys for initiating and maintaining operation of said shifting means in one or alternatively the opposite direction including an adjustable element, and a displaceable arm having operating connection with said element and pivotal connection with said shift keys; said arm being operable by one or alternatively the other of said shift keys to move and then hold said element in shift initiating position; a spring extended plunger on said arm movable upon shift initiating operation of said arm into the path of the lug of a set tabulator key whereby said lug is rendered effective upon movement of the carriage in either direction into the denominational position of the set tabulator key to displace said arm thereby breaking the operating connection and releasing said element, and means operable to restore said element when released; with means for terminating operation of said shifting means in response to restoration of said element, and means for restoring said arm and remaking the operating connection with said element upon release of the operated shift key thereby locating said plunger in position to be depressed by engagement with the lug of said set tabulator key upon subsequent operation of a shift key to permit said arm to be moved to shift initiating position.

13. The invention according to claim 12 wherein the shiftable carriage is provided with a pair of lugs fixed thereon, the spring extended plunger is movable upon shift initiating operation of the arm into the path of said fixed lugs thereby rendering one or the other of said lugs effective upon movement of the carriage into one or the other extreme end position respectively to displace said arm, and wherein the means for restoring the arm and remaking the operating connection upon release of the operated shift key is effective to locate the plunger in position to be depressed by engagement with said effective fixed lug upon subsequent operation of a shift key to permit said arm to be moved to shift initiating position.

14. In a calculating machine having a denominationally shiftable register carriage and reversible motor driven carriage shifting means; the combination of settable denominational tabulator keys on the carriage having cam lugs, right and left carriage shift keys, means controlled by said shift keys for initiating and maintaining operation of said shifting means in one or alternatively the opposite direction including a rock shaft, a spring retracted latch fast upon said rock shaft, and a displaceable spring retracted arm having operating connection comprising said latch with said rock shaft and pivotal connection with said shift keys; said arm being operable by one or alternatively the other of said shift keys to rock and then hold said shaft through the medium of said latch in shift initiating position; and said arm being movable in the shift initiating operation into the path of the lug of a set tabulator key whereby said lug is rendered effective upon movement of the carriage in either direction into the denominational position of the set tabulator key to displace said arm thereby releasing said latch for retraction and restoration of said rock shaft therewith; with means for terminating operation of said shifting means in response to restoration of said rock shaft and means comprising the spring for retracting the arm for remaking the operating connection upon release of the operated shift key.

15. In a calculating machine having a denominationally shiftable register carriage and motor driven carriage shifting means; the combination of settable denominational tabulator keys on the carriage having cam lugs, a carriage shift key, means controlled by said shift key for initiating and maintaining operation of said shifting means including an adjustable element, and a displaceable arm having operating connection with said element and pivotal connection with said shift key; said arm being operable by said shift key to move and then hold said element in shift initiating position; and said arm being movable in the shift initiating operation into the path of the lug of a set tabulator key whereby said lug is rendered effective upon movement of the carriage into the denominational position of the set tabulator key to displace said arm thereby breaking the operating connection and releasing said element; and means operable to restore said element when released; with means for terminating operation of said shifting means in response to restoration of said element, and means for restoring said arm and remaking the operating connection with said element upon release of the operated shift key.

16. The invention according to claim 15 wherein the element is movable to shift initiating position independently of and without displacement of the arm having operating connection therewith.

HERMAN GANG.

REFERENCES CITED

The following references are of record in the file of this patent:

UNITED STATES PATENTS

| Number | Name | Date |
| --- | --- | --- |
| 2,331,829 | Friden et al. | Oct. 12, 1943 |
| 2,398,286 | Carlstrom et al. | Apr. 9, 1946 |
| 2,403,273 | Friden et al. | July 2, 1946 |
| 2,419,760 | Britten, Jr. | Apr. 29, 1947 |
| 2,428,206 | Dustin | Sept. 30, 1947 |